US012510507B2

(12) United States Patent
Biring et al.

(10) Patent No.: US 12,510,507 B2
(45) Date of Patent: Dec. 30, 2025

(54) TWO-WAY FLUID SENSING DEVICE, TWO-WAY FLUID SENSING METHOD, AND THE MANUFACTURING METHOD OF THE FLUID SENSING DEVICE

(71) Applicant: Ming Chi University of Technology, New Taipei (TW)

(72) Inventors: Sajal Biring, New Taipei (TW); Rahim Bakash Kolaru, New Taipei (TW)

(73) Assignee: MING CHI UNIVERSITY OF TECHNOLOGY, New Taipei (TW)

( * ) Notice: Subject to any disclaimer, the term of this patent is extended or adjusted under 35 U.S.C. 154(b) by 429 days.

(21) Appl. No.: 18/108,361

(22) Filed: Feb. 10, 2023

(65) Prior Publication Data

US 2024/0219341 A1    Jul. 4, 2024

(30) Foreign Application Priority Data

Dec. 30, 2022  (TW) ................................. 111150990

(51) Int. Cl.
    *G01N 27/414*    (2006.01)
(52) U.S. Cl.
    CPC ..... *G01N 27/4145* (2013.01); *G01N 27/4146* (2013.01); *G01N 27/4148* (2013.01)
(58) Field of Classification Search
    CPC .................. G01N 27/4145; G01N 27/4146
    See application file for complete search history.

(56) References Cited

U.S. PATENT DOCUMENTS

| | | | | |
|---|---|---|---|---|
| 2012/0304741 | A1* | 12/2012 | Roy ................... | G01N 27/4145 73/31.06 |
| 2014/0105790 | A1* | 4/2014 | Gaudon ................ | G01N 27/16 422/90 |
| 2016/0061761 | A1* | 3/2016 | Shim .................... | G01N 27/122 436/151 |
| 2016/0370336 | A1* | 12/2016 | Ahn ..................... | G01N 27/121 |
| 2021/0349045 | A1* | 11/2021 | Choi ........................ | G01K 7/16 |

OTHER PUBLICATIONS

Yuyan Chen et al., "Thin film transistors based on poly(3-hexylthiophene)/[6,6]-phenyl C61 butyric acid methyl ester heterojunction for ammonia detection", Chemical Physics Letters, vol. 638 (2015) 87-93.

(Continued)

*Primary Examiner* — Erik Kielin
(74) *Attorney, Agent, or Firm* — WPAT, PC

(57) ABSTRACT

Provided are a two-way fluid sensing device, a two-way fluid sensing method, and the manufacturing method of the fluid sensing device. The fluid sensing device includes: a substrate, which is a through-hole membrane with channels penetrating from the top surface to the bottom surface of the substrate; an interdigitated electrode having a plurality of interdigitated structures and disposed on the substrate; and a fluid sensing layer containing fluid sensing material and disposed on the interdigitated electrode. Therefore, fluid molecules can interact with the fluid sensing layer from both the top and bottom sides of the fluid sensing device, such that the fluid sensing device of the present invention can exhibit higher sensitivity, and can be vertically integrated with other electronic devices or 3D circuits.

18 Claims, 30 Drawing Sheets

(56) References Cited

OTHER PUBLICATIONS

Shashi Tiwari et al., "Poly-3-hexylthiophene (P3HT)/graphene nanocomposite field-effect-transistor as ammonia detector", J. Nanosci. Nano-Technol. vol. 16 (9) (2016) 9634-9641.

Tao Xie et al., "Ammonia gas sensors based on poly (3-Hexylthiophene)-molybdenum disulfide film transistors", Nanotechnology vol. 27 (6) (2016).

Shijiao Han et al., " Poly(3-hexylthiophene)/polystyrene (P3HT/PS) blends based organic field-effect transistor ammonia gas sensor", Sens. Actuators, B: Chem. vol. 225 (2016) 10-15.

Liang-Yu Chang, et al., "One-minute fish freshness evaluation by testing the volatile amine gas with an ultrasensitive porous-electrode-capped organic gas sensor system", ACS Sens. vol. 2 (4) (2017) 531-539.

Seohyun Mun et al., "Highly sensitive ammonia gas sensor based on single-crystal Poly(3-Hexylthiophene) (P3HT) organic field effect transistor", Langmuir vol. 33 (47) (2017) 13554-13560.

Chin-Guo Kuo et al., "Fabrication of a P3HT-ZnO nanowires gas sensor detecting ammonia gas", Sensors vol. 18 (1) (2017).

Lam Minh Long et al., "Characterization of NH3 sensing properties of P3HT+rGO+CNT composite films made by spin-coating", Commun. Phys. vol. 28 (4) (2018), pp. 369-377.

Xiaohong Wang et al., "Ultrathin semiconductor films for NH3 gas sensors prepared by vertical phase separation", Synth. Met. vol. 244 (2018) 20-26.

V.R. Rajeev et al., "Ammonia gas detection using field effect transistor based on a solution-processable organic semiconductor", Vacuum vol. 158 (2018) 271-277.

Shiyu Wei, et al., "Helical nanofibrils of block copolymer for high-performance ammonia sensors", ACS Appl. Mater. Interfaces vol. 10 (26) (2018) 22504-22512.

Shang-Yu Yu, et al., "A versatile method to enhance the operational current of air-stable organic gas sensor for monitoring of breath ammonia in hemodialysis patients", ACS Sens. vol. 4 (4) (2019) 1023-1031.

Alem Araya Meresa et al., "Selective ammonia-sensing platforms based on a solution-processed film of poly(3-Hexylthiophene) and p-doping tris(Pentafluorophenyl) borane", Polymers vol. 12 (1) (2020).

Tran Si Trong Khanh, et al., "Ammonia gas sensing characteristic of P3HT-rGO-MWCNT composite films", Appl. Sci. vol. 11 (15) (2021).

\* cited by examiner

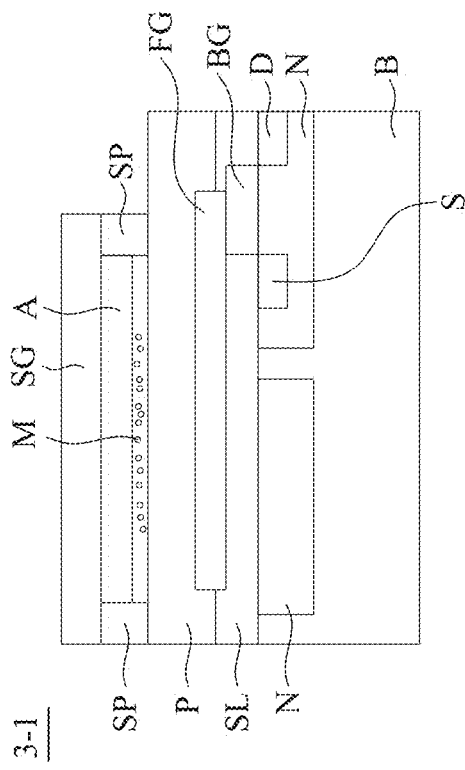
FIG. 3A (PRIOR ART)
FIG. 3B (PRIOR ART)
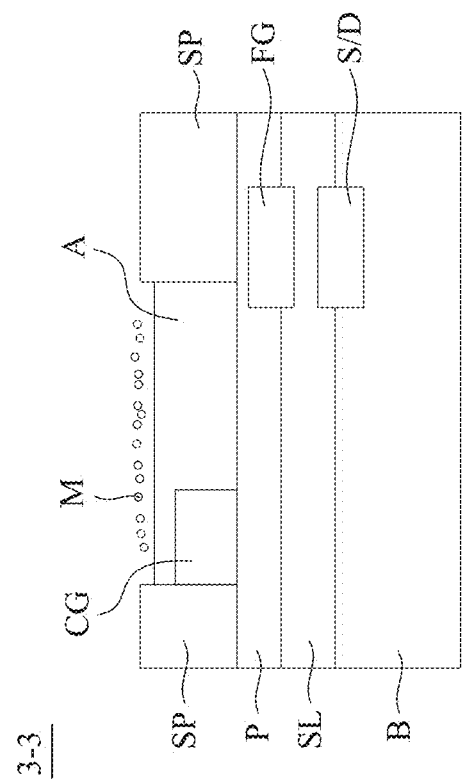
FIG. 3C (PRIOR ART)
FIG. 3D (PRIOR ART)

TWO-WAY FLUID SENSING DEVICE, TWO-WAY FLUID SENSING METHOD, AND THE MANUFACTURING METHOD OF THE FLUID SENSING DEVICE

CROSS-REFERENCE TO RELATED APPLICATION

This application claims the priority of Taiwanese patent application No. 111150990, filed on Dec. 30, 2022, which is incorporated herewith by reference.

BACKGROUND OF THE INVENTION

1. Field of the Invention

The present invention relates to a two-way fluid sensing device, a two-way fluid sensing method, and the manufacturing method of the two-way fluid sensing method, and more particularly, to a fluid sensing device, that uses a through-hole membrane as a substrate, thereby allowing sensing fluid from both sides of the fluid sensing layer, a fluid sensing method using the device, and a manufacturing method of the fluid sensing device.

2. The Prior Arts

In order to detect fluid such as gas and/or liquid, tremendous research efforts are going on by exploiting various transducing technologies, e.g., optical, electrical, acoustic, colorimetric, gas chromatography, etc., so as to develop effective liquid sensors. Among various liquid sensors based on different transducing principles, conductometric sensors are highly promising due to simplicity in fabrication and measurements, but suffer from relatively low sensitivity and limit of detection.

For conductometric sensors, rigorous researches on different materials, especially inorganic semiconductive oxides ($ZnO$, $SnO_2$, ITO, $WO_3$, NiO) have been conducted for improving single or multiple crucial parameters of the sensor, such as sensitivity, selectivity, limit of detection, stability, etc.

However, recently, organic semiconductive materials are competing successfully with inorganic materials and applied in numerous optoelectronic devices such as light-emitting diodes, photovoltaic devices, photodetectors, thin-film transistors, up-conversion devices, sensors, etc. Optoelectronic devices based on organic semiconductive molecules are attractive due to multiple advantages, e.g., low fabrication cost, simple and low-temperature in fabrication process, and compatibility with the flexible substrates.

The most intriguing feature of organic semiconductive materials is that the required material properties for specific applications can be controlled by laboratory synthesis. For example, poly(3-hexylthiophene-2,5-diyl) (P3HT) is one of such organic conductive materials, as a conductive polymer, which shows remarkable sensitivity towards $NH_3$ molecules. Therefore, extensive researches on polymer shape and sensor structures are conducted for modification, in order to achieve the best performance of the P3HT-based ammonia sensors. Generally, P3HT molecules are used in corporation with matrix, or they are made into composite to enhance the response to ammonia molecules.

According to the structure, conductometric fluid sensors based on organic semiconductive materials can be classified as: two-terminal fluid sensors, such as conductor-type sensors; and three-terminal fluid sensors, such as transistor-type sensors.

Referring to FIGS. 1A to 3D, which illustrate two-terminal fluid sensors 1-1 and 1-2 and three-terminal fluid sensors 2-1 to 2-4 and 3-1 to 3-4 of the prior art, respectively.

In the sensor 1-1, two interdigitated electrodes IDE and an active layer (fluid sensing layer) A are provided in the same layer, and are provided on a substrate B together. The exposed top side of the active layer A can be in contact with fluid molecules M, so as to sense the fluid by interacting with the fluid molecules M.

In the sensor 1-2, a second electrode E2 is provided on a substrate B, an active layer A is provided on the second electrode E2, and a first electrode E1 is provided on a part of the top surface of the active layer A. The exposed top side (wherein the first electrode E1 is not provided) of the active layer A can be in contact with fluid molecules M, so as to sense the fluid by interacting with the fluid molecules M.

The sensor 2-1 has a bottom gate bottom contact structure, wherein a gate G is provided on a substrate B, an insulating layer I is provided on the gate G, a source S and a drain D are respectively provided on parts of the top surface of the insulating layer I and separated from each other, an active layer A is provided on another part of the top surface of the insulating layer I and covers the source S and the drain D. The exposed top side of the active layer A can be in contact with fluid molecules M, so as to sense the fluid by interacting with the fluid molecules M.

The sensor 2-2 has a bottom gate top contact structure, wherein a gate G is provided on a substrate B, an insulating layer I is provided on the gate G, an active layer A is arranged on the insulating layer I, a source S and a drain D are respectively provided on parts of the top surface of the active layer A and separated from each other. The exposed top side (where the source S and the drain D are not provided) of the active layer A can be in contact with fluid molecules M, so as to sense the fluid by interacting with the fluid molecules M.

The sensor 2-3 has a top gate bottom contact structure, wherein a source S and a drain D are respectively provided on parts of the top surface of a substrate B and separated from each other, an active layer A is provided on another part of the top surface of the substrate B and covers the source S and the drain D, an insulating layer I is provided on a part of the top surface of the active layer A, a gate G is provided on the insulating layer I. The exposed top side (where the insulating layer I is not provided) of the active layer A can be in contact with fluid molecules M, so as to sense the fluid by interacting with the fluid molecules M.

The sensor 2-4 has a top gate top contact structure, wherein an active layer A is provided on a substrate B, a source S, a drain D and an insulating layer I are respectively provided on parts of the top surface of the active layer A and separated from one another, a gate G is provided on the insulating layer I. The exposed top side (where source S, the drain D and the insulating layer I are not provided) of the active layer A can be in contact with fluid molecules M, so as to sense the fluid by interacting with the fluid molecules M.

The sensor 3-1 is a floating gate field effect transistor (FG-FET), wherein a substrate B is a silicon substrate, and the top surface of the substrate B is recessed downward, such that a plurality of n-wells N are respectively disposed in the recesses of the substrate B and separated from each other; the top surface of one of the n-type wells N is recessed downward, such that a source S and a drain D are respectively disposed in the recesses of the n-type wells N and separated from each other; a silicon dioxide layer SL is provided on the substrate B, the n-type wells N, the source S and the drain D; a buried gate BG is provided in the silicon dioxide layer SL; a floating gate FG is provided on a part of the top surface of the silicon dioxide layer SL and on a part of the top surface of the buried gate BG; a passivation layer P is provided on another part of the top surface of the silicon dioxide layer SL and covers the floating gate FG; a support/protector SP is provided on the passivation layer P, such that an active layer A is provided above the passivation layer P in a manner that there is a gap between the active layer A and the passivation layer P; a suspended gate SG is provided on the active layer A. The exposed bottom side (which is located in the gap between the active layer A and the passivation layer P provided by the support/protector SP) of the active layer A can be in contact with fluid molecules M, so as to sense the fluid by interacting with the fluid molecules M.

The sensor 3-2 is a suspended gate FET, wherein a source S and a drain D are respectively provided on parts of the top surface of a substrate B and separated from each other, the active layer A is provided on the source S and the drain D in a manner that there is a gap between the active layer A and the substrate B, an insulating layer I is provided on the active layer A, a gate G is provided on the insulating layer I. The exposed bottom side (which is located in the gap between the active layer A and the substrate B) of the active layer A can be in contact with fluid molecules M, so as to sense the fluid by interacting with the fluid molecules M.

The sensor 3-3 is a horizontal floating gate FET, wherein A substrate B is a silicon substrate, an silicon dioxide layer SL is provided on the substrate B, a passivation layer P is provided on the silicon dioxide layer SL, Source/drain S/D is provided between the silicon dioxide layer SL and the substrate B, a floating gate FG is provided between a passivation layer P and the silicon dioxide layer SL, a control gate CG is provided on a part of the top surface of the passivation layer P, an active layer A is provided on another part of the top surface of the passivation layer P and covers the control gate CG. A support/protector SP is provided on another part of the top surface of the passivation layer P where the control gate CG and the active layer A are not provided, the support/protector SP protrudes beyond the active layer A, so as to provide a gap on the top surface of the active layer A. The exposed top side (which is locate in the gap provided by the support/protector SP) of the active layer A can be in contact with fluid molecules M, so as to sense the fluid by interacting with the fluid molecules M.

The sensor 3-4 is a capacitively coupled field effect transistor, wherein a gate oxide layer G-oxide is provided on a substrate B, a gate G is provided in the gate oxide layer G-oxide, a source S and a drain D as well we an active layer A are provided in the same layer, and are provided on the gate oxide layer G-oxide together. The exposed top side of the active layer A can be in contact with fluid molecules M, so as to sense the fluid by interacting with the fluid molecules M.

The characteristics of the above-mentioned fluid sensors 1-1 to 3-4 are listed in Table 1.

TABLE 1

| Sensor | Available area for interaction | Fabrication complexity | Interaction side | Operating voltage (V) | Required voltage source(s) | Feasibility of vertical integration | Drawbacks |
|---|---|---|---|---|---|---|---|
| 1-1 | Partial top surface | Low | Only top side | 0 to 5 | 1 | No | Some surface area is sacrificed to two electrodes. |
| 1-2 | Partial top surface | Low | Only top side | 0 to 5 | 1 | No | Some surface area is sacrificed to the first electrode. |
| 2-1 | Whole top surface | High | Only top side | 0 to −60 | 2 | No | High operating voltages is required. |
| 2-2 | Partial top surface | High | Only top side | 0 to −60 | 2 | No | Some surface area is sacrificed to source and drain contacts. |
| 2-3 | Partial top surface | High | Only top side | 0 to −60 | 2 | No | Some surface area is sacrificed to gate contact. |
| 2-4 | Partial top surface | High | Only top side | 0 to −60 | 2 | No | Some surface area is sacrificed to source, drain and gate contacts. |
| 3-1 | Partial bottom surface | Very high | Only bottom side | 0 to −100 | 2 | Yes | Some surface area is sacrificed to gate contact. |
| 3-2 | Partial bottom surface | Very high | Only bottom side | 0 to −100 | 2 | Yes | Some surface area is sacrificed to source and drain contacts. |
| 3-3 | Partial top surface | Very high | Only top side | 0 to −100 | 2 | No | Some surface area is sacrificed to gate contact. |
| 3-4 | Partial top surface | Very high | Only top side | 0 to −100 | 2 | No | Some surface area is sacrificed to source and drain contacts. |

As can be seen from Table 1, in the sensors 1-1 to 3-4 of the prior art, since one surface (or one side) of the active layer, i.e., the fluid sensing layer must be completely in contact with another layer and thus cannot sense the fluid, only the other surface (or the other side, that is, the top or bottom side) of the active layer is available for sensing the fluid by interacting with the fluid molecules. Moreover, for the above-mentioned sensors of the prior art other than the sensor 2-1, since the active layer must be in contact with the source, drain or gate, a part of the surface area of the side where the active layer interacts with fluid molecules (i.e., the interaction side) must be sacrificed to such contact, thereby reducing the fluid sensing efficiency.

In addition, as can be seen from FIGS. 1A to 3D, the three-terminal fluid sensors 3-1 to 3-4, as transistor-type fluid sensors, have the highest structural complexity; the three-terminal fluid sensors 2-1 to 2-4 with top/bottom gate-top/bottom contact structure have the secondary highest structural complexity; while the two-terminal fluid sensors 1-1 and 1-2 have the lowest structural complexity. Therefore, the two-terminal fluid sensors 1-1 and 1-2 have low fabrication complexity, short fabrication time, and low fabrication cost; the three-terminal fluid sensors 2-1 to 2-4 have high fabrication complexity, long fabrication time, and high fabrication cost; while the three-terminal fluid sensors 3-1 to 3-4 have very high fabrication complexity, very long fabrication time, and very high fabrication cost.

Accordingly, due to the structural complexity, the three-terminal fluid sensors 3-1 to 3-4, as transistor-type fluid sensors, have the highest operating voltage, which ranges from 0 to −100V; the three-terminal fluid sensors 2-1 to 2-4 with top/bottom gate-top/bottom contact structure have the secondary highest operating voltage, which ranges from 0 to −60V; while the two-terminal fluid sensors 1-1 and 1-2 have the lowest operating voltage, which ranges from 0 to 5V. Therefore, the three-terminal fluid sensors 2-1 to 3-4 require a larger number of voltage sources, they require 2 voltage sources; while the two-terminal fluid sensors 1-1 and 1-2 require a less number of voltage sources, they only require one voltage source.

Further, as shown in FIGS. 3A and 3B, in the sensors 3-1 and 3-2, since the interaction side for fluid sensing is provided in the gap between one layer and another layer, the top layers of the sensors 3-1 and 3-2 can be used for vertical integration with other devices or 3D circuits (i.e., other devices or 3D circuits can be provided on the top layers) without hindering the fluid sensing, so that the sensors 3-1 and 3-2 have the feasibility of vertical integration. However, in other sensors other than the sensors 3-1 and 3-2, since the vertical integration must be performed on the interaction side of the active layer used for fluid sensing, the fluid sensing is not available, so that these sensors do not have the feasibility of vertical integration.

It is noted that for the three-terminal fluid sensor 2-1, although no surface area of the interaction side is sacrificed, a high operating voltage of 0 to −60V is still required for normal operation.

As described above, the two-terminal or three-terminal conductometric fluid sensors based on organic semiconductive materials in the prior art have one or more of the following disadvantages that: the surface area for interaction (or sensing) is limited, and vertical integration with other devices or 3D circuits is not available. Especially, for the three-terminal fluid sensors, there are disadvantages of high fabrication complexity, long fabrication time, and high fabrication cost.

SUMMARY OF THE INVENTION

In view of the above disadvantages, one objective of the present invention is to improve the problems of the fluid sensing device in the prior art, such as limited surface area for sensing, inability of vertical integration, high operating voltage, and high fabrication complexity.

In order to achieve the foregoing objectives, the present invention provides a two-way fluid sensing device, comprising: a substrate, which is a through-hole membrane having a plurality of channels penetrating from a top surface of the substrate to a bottom surface of the substrate; an interdigitated electrode, which has a plurality of interdigitated structures, and is provided on the substrate; and a fluid sensing layer, which contains a fluid sensing material, and is provided on the interdigitated electrode.

According to an embodiment, the through-hole membrane is an anodic aluminum oxide through-hole membrane.

According to an embodiment, the plurality of channels of the through-hole membrane has an average diameter of 20 to 200 nm and a length of 50 to 70 µm.

According to an embodiment, the fluid sensing material includes poly(3-hexylthiophene-2,5-diyl).

According to an embodiment, the interdigitated electrode includes: a conductive metal layer, which contains a conductive metal, and is provided on the substrate; and a conductive polymer layer, which contains a conductive polymer, and is provided between the conductive metal layer and the fluid sensing layer.

According to an embodiment, the conductive metal includes Ag, and the conductive polymer includes poly(3,4-ethylenedioxythiophene)-poly(styrene sulfonate).

According to an embodiment, the fluid sensing layer has a thickness of 15 to 20 nm.

According to an embodiment, the conductive metal layer has a thickness of 175 to 225 nm, and the conductive polymer layer has a thickness of 40 to 60 nm.

According to an embodiment, the substrate has a thickness of 50 to 70 µm.

According to an embodiment, the interdigitated electrode includes: a first interdigitated electrode having a plurality of first interdigitated structures separated from each other; and a second interdigitated electrode having a plurality of second interdigitated structures separated from each other, and wherein the first interdigitated electrode and the second interdigitated electrode are disposed on the substrate in a manner that the plurality of first interdigitated structures and the plurality of second interdigitated structures are alternately arranged.

According to an embodiment, single first interdigitated structure or single second interdigitated structure has a length of 0.75 to 1.25 mm and a width of 17.5 to 22.5 µm; a space between adjacent first interdigitated structure and second interdigitated structure is 75 to 85 µm.

In addition, the present invention further provides a two-way fluid sensing method for detecting a concentration of a specific fluid in a specific environment using the aforementioned two-way fluid sensing device, comprising:
a) exposing the two-way fluid sensing device to the specific environment;
b) applying a bias voltage to the two-way fluid sensing device;
c) measuring a current passing through the two-way fluid sensing device; and
d) converting the concentration of the specific fluid in the specific environment from the measured current.

In addition, the present invention further provides a manufacturing method of a two-way fluid sensing device, comprising:
a) depositing a conductive metal layer on a substrate, wherein the substrate is a through-hole membrane having a plurality of channels penetrating from a top surface of the substrate to a bottom surface of the substrate;
b) coating a conductive polymer layer on the conductive metal layer;

c) annealing the substrate including the conductive metal layer and the conductive polymer layer, for example, at 110 to 130° C. for 15 to 25 minutes;

d) etching the conductive metal layer and the conductive polymer layer, which are annealed, by a fiber laser, thereby forming an interdigitated electrode;

e) coating a fluid sensing material layer on the substrate formed with the interdigitated electrode thereon.

As described above, in the fluid sensing device of the present invention, a through-hole membrane having nanochannels is used as a substrate, and a fluid sensing layer is provided on the substrate. Therefore, the fluid molecules not only can interact with the fluid sensing layer from the top side of the fluid sensing device, but also can interact with the fluid sensing layer from the bottom side of the fluid sensing device through the nanochannels of the substrate and the interdigitated electrode. Accordingly, the fluid sensing device of the present invention not only exhibits higher sensitivity (i.e., the limit of detection is lower); but also can normally conduct the fluid sensing function and be vertically integrated with other electronic devices or 3D circuits, even if the fluid molecules cannot contact the fluid sensing layer from the top side of the fluid sensing device.

BRIEF DESCRIPTION OF THE DRAWINGS

FIGS. 3A to 3D illustrate three-terminal fluid sensors 3-1 to 3-4 of the prior art, respectively;

DETAILED DESCRIPTION OF THE PREFERRED EMBODIMENT

Figure 1A:
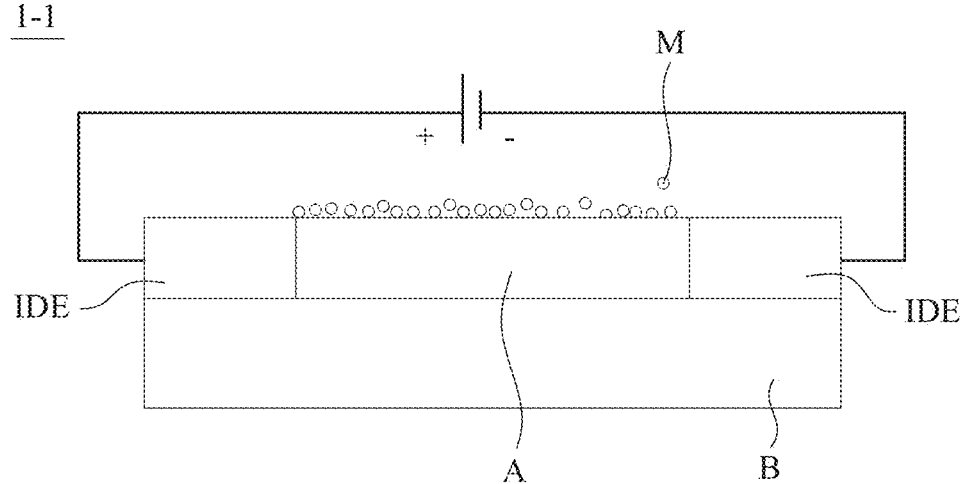
FIGS. 1A and 1B illustrate stack structures of two-terminal fluid sensors 1-1 and 1-2 of the prior art, respectively.
Figure 1B:
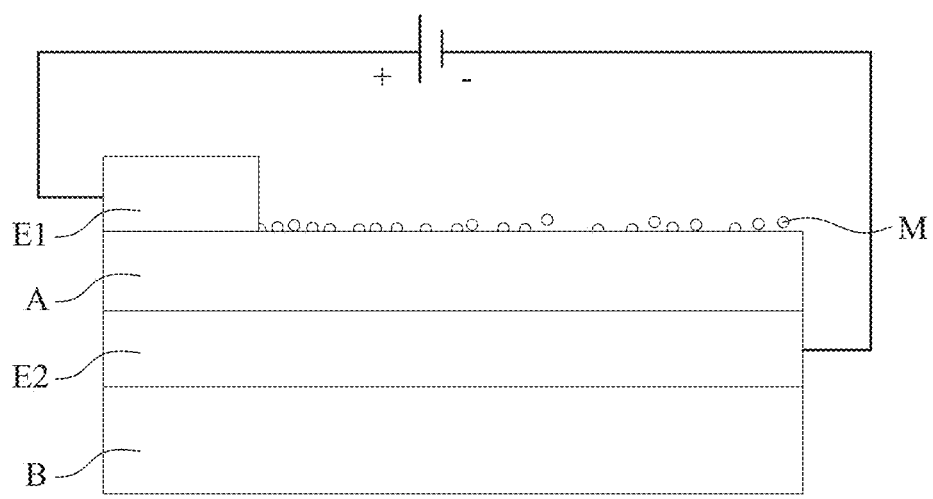
Figure 2B:
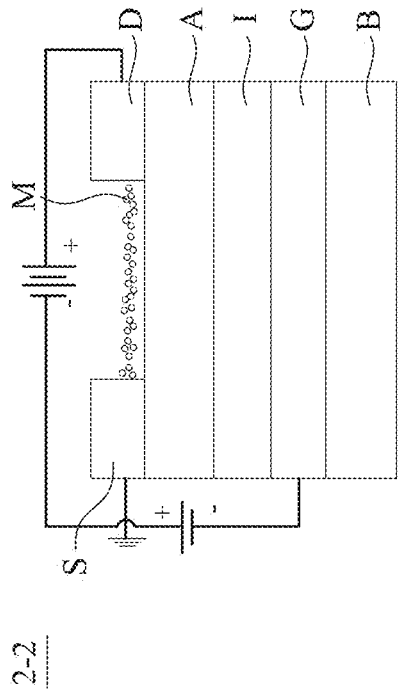
FIGS. 2A to 2D illustrate three-terminal fluid sensors 2-1 to 2-4 of the prior art, respectively.
Figure 2D:
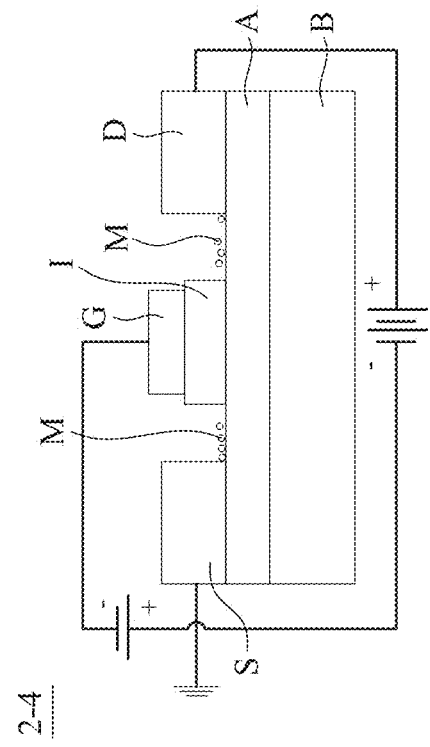
Figure 2A:
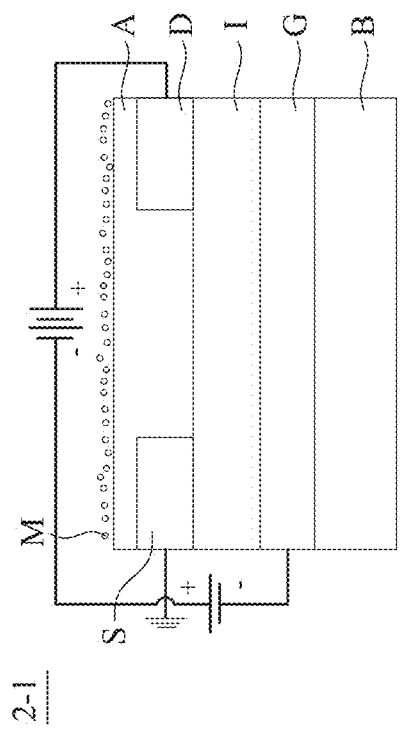
Figure 2C:
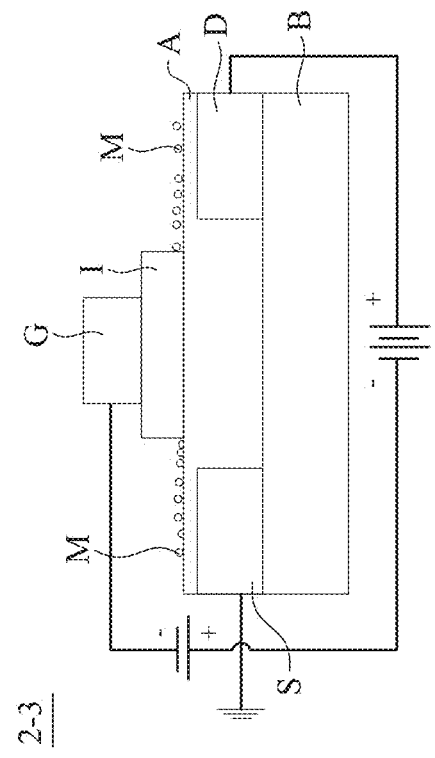

Embodiments of the two-way fluid sensing device, the two-way fluid sensing method, and the manufacturing method of the device of the present invention will be described in detail below with reference to the drawings. In the drawings, same reference numerals may refer to same or similar elements even though they are illustrated in different drawings. Also, hereinafter, descriptions for functions and elements that are well known in the art will be omitted when it is determined that such descriptions may obscure the subject matter in some embodiments of the present invention. Terms such as "comprising", "including", "having" and "consisting of", etc. used herein are generally intended to permit the presence of other elements/components unless these terms are used in conjunction with the term "only". As used herein, the singular form is intended to include the plural form unless otherwise indicated.

When it is recited that a first element is provided "on" or "under" a second element, or a first element is "connected" or "coupled" to a second element, etc., it not only includes the circumstances that a first element is directly provided "on" or "under" a second element, or a first element is directly "connected" or "coupled" to a second element, etc., but also includes the circumstances that another element is "interposed" between the first and second elements, or the first and second elements is indirectly "connected" or "coupled" through another element.

When time-relative terms, such as "after", "then", "next", "before", etc. are used to describe the process or steps of a method, or the operation or configuration of device or equipment, these terms can be used to describe discrete processes, steps, operations, or configurations, unless they are used in conjunction with the terms "directly" or "immediately".

In addition, when referring to any size, relative size, etc., it should be considered that the numerical value or corresponding information (e.g., extent, range, etc.) of the element or feature includes tolerance or error range, which may be caused by various factors (e.g., processing factors, internal or external influences, noise, etc.) even in the absence of specific relevant description. Furthermore, the term "may" fully encompasses all meanings of the term "can".

It can be understood that as the device or apparatus rotates, the spatial orientation and relative positions of the elements will change accordingly.

If there is no conflict, the technical features of any embodiment of the two-way fluid sensing device, the two-way fluid sensing method, and the manufacturing method of the device described in this specification can be applied to other embodiments of the two-way fluid sensing device, the two-way fluid sensing method, and the manufacturing method of the present invention.

In order to further improve the sensitivity and limit of detection of the fluid sensing device, the present invention develops a two-terminal two-way fluid sensing device 10, wherein a fluid sensing layer is provided on a through-hole membrane (e.g., an anodic aluminum oxide (AAO) through-hole membrane) as a substrate. Through-hole membrane is a unique nanoporous material, which can be used as a template for manufacturing specific nano-structures, or can be used as a substrate having enormous surface area.

In the present invention, there are two purposes for the application of through-hole membrane as the substrate: i) enlarging the interaction area between the indicator (i.e., the fluid sensing material, for example P3HT described below) molecules and the analyte (i.e., the fluid, for example $NH_3$) molecules, and ii) allowing the analyte molecules to pass through the nanochannels from the bottom surface of the substrate at the bottom of the fluid sensing device for interacting with the indicators on the top of the fluid sensing device, thereby enabling the provision of other device or circuits on whole top surface of the uppermost layer of the fluid sensing device.

Figure 4:
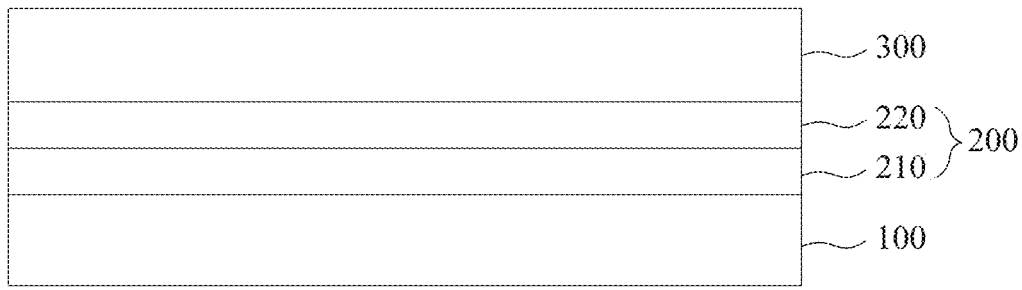
FIG. 4 illustrates the stack structure of the two-way fluid sensing device of the present invention.

Referring to FIG. 4, the fluid sensing device 10 of the present invention comprises: a substrate 100; an interdigitated electrode 200 disposed on the substrate 100; and a fluid sensing layer 300 provided on the interdigitated electrode 200.

Figure 5:
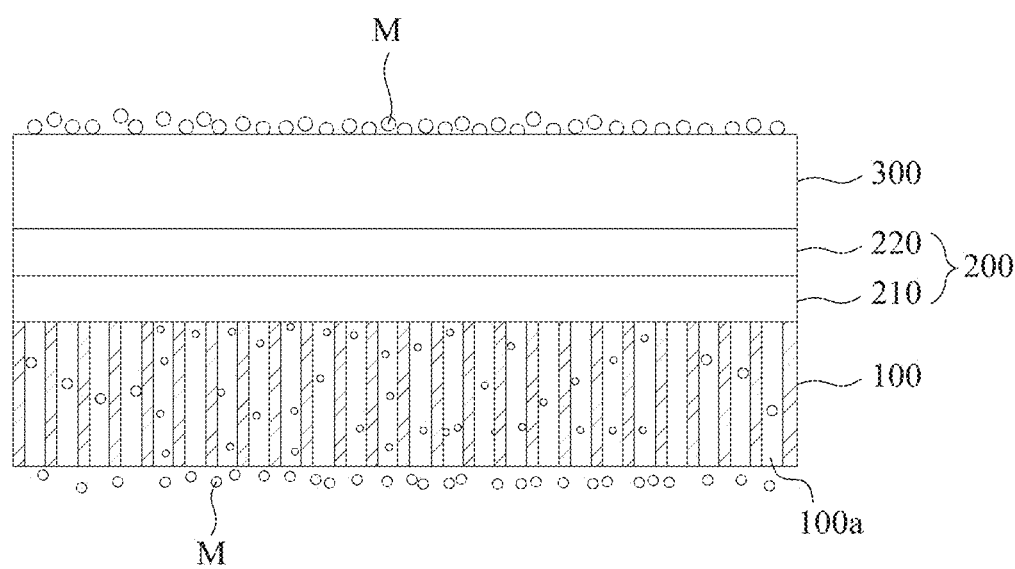
FIG. 5 illustrates a side cross-sectional view of the stack structure of the two-way fluid sensing device of the present invention.

Referring to FIG. 5, the substrate 100 of the present invention can be a through-hole membrane having a plurality of channels 100a penetrating from the top surface to the bottom surface of the substrate 100. The substrate 100 may have a thickness of 50 to 70 µm, e.g., 60 µm. Same as the thickness of the substrate 100, the length of the channels 100a may be 50 to 70 µm, e.g., 60 µm. The channels 100a may have an average diameter of 20 to 200 nm, e.g., 20, 100 or 200 nm. The through-hole membrane as the substrate is referred to as through-hole substrate herein.

Referring to FIG. 4, the interdigitated electrode 200 of the present invention comprises: a conductive metal layer 210, which contains a conductive metal such as Ag; and a conductive polymer layer 220, which contains a conductive polymer, such as poly(3,4-ethylenedioxythiophene)-poly(styrene sulfonate) (PEDOT:PSS). The conductive metal layer 210 is provided on the substrate 100, and the conductive polymer layer 220 is provided between the conductive metal layer 210 and the fluid sensing layer 300.

The conductive metal layer 210 may have a thickness of 175 to 225 nm, e.g., 200 nm; and the conductive polymer layer 220 may have a thickness of 40 to 60 nm, e.g., 50 nm.

Figure 6:
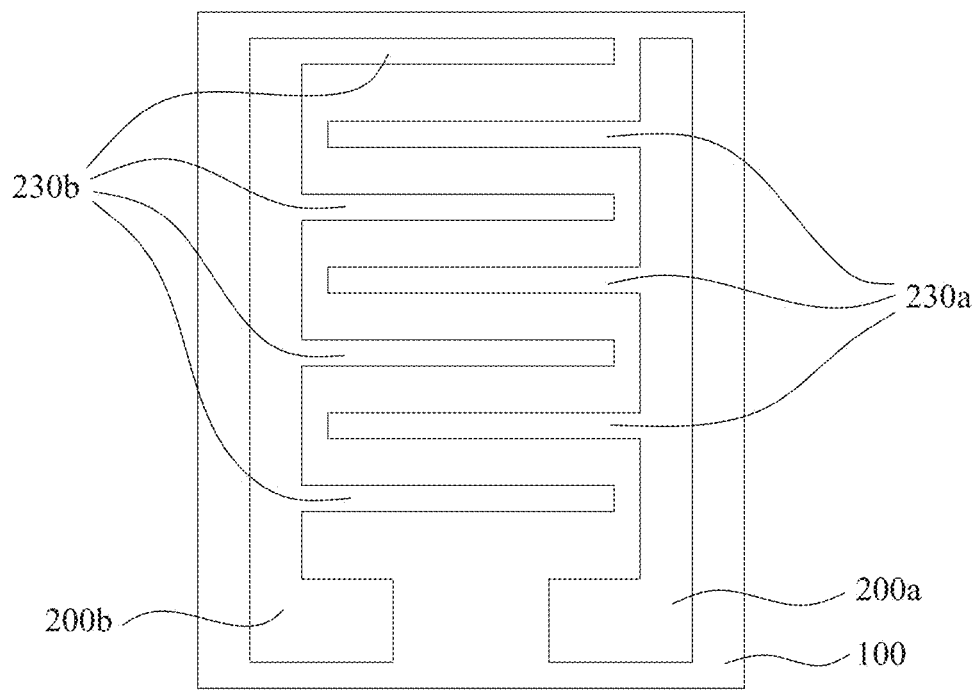
FIG. 6 illustrates a top view of the two-way fluid sensing device of the present invention (without the fluid sensing layer)

As shown in FIG. 6, the interdigitated electrode 200 may include a first interdigitated electrode 200a and a second interdigitated electrode 200b, wherein the first interdigitated electrode 200a and the second interdigitated electrode 200b each include the above-mentioned conductive metal layer 210 and conductive polymer layer 220. The first interdigitated electrode 200a has a plurality of first interdigitated structures 230a separated from each other; and the second interdigitated electrode 200b has a plurality of second interdigitated structures 230b separated from each other. The first interdigitated electrode 200a and the second interdigitated electrode 200b are disposed on the substrate 100 in a manner that the first interdigitated structures 230a and the second interdigitated structures 230b are alternately arranged.

For the two-way fluid sensing device of the present invention, the shape and size of the interdigitated structures were optimized by investigating several patterns with different shapes and sizes. Single first interdigitated structure 230a or single second interdigitated structure 230b of the present invention may have a length of about 0.75 to 1.25 mm, e.g., 1 mm, and a width of about 17.5 to 22.5 µm, e.g., 20 µm. The space between adjacent first interdigitated structure 230a and second interdigitated structure 230b may be 75 to 85 µm, e.g., 80 µm.

The fluid sensing layer 300 of the present invention includes a fluid sensing material, such as poly(3-hexylthiophene-2,5-diyl) (P3HT). The fluid sensing layer 300 may have a thickness of 15 to 20 nm.

Therefore, as shown in FIG. 5, since in the fluid sensing device 10 of the present invention, an through-hole membrane having nanochannels is used as the substrate 100, fluid molecules M not only can contact the fluid sensing layer 300 of the fluid sensing device 10 from the top side of the fluid sensing device 10 (e.g., the top surface of the fluid sensing layer 300), but also can contact the bottom surface (which faces the interdigitated electrode 200) of the fluid sensing layer 300 from the bottom side of the fluid sensing device 10 (e.g., the bottom surface of the substrate 100) through the channels 100a and the gap between the interdigitated structures 230a and 230b of the interdigitated electrode 200. Accordingly, the fluid sensing device 10 can sense the fluid from both top and bottom sides, that is, the fluid sensing device 10 of the present invention is a two-way fluid sensing device.

The manufacture and performance test of the two-way fluid sensing device of the present invention will be described in detail below. For comparison, interdigitated electrodes are formed by laser-patterning the layer including the conductive metal and the conductive polymer on a glass substrate (comparative example) and a through-hole substrate (inventive example), P3HT is used to form a fluid sensing layer on the interdigitated electrodes, so as to manufacture a high-efficiency conductometric fluid sensing device having customized interdigitated electrodes.

Materials

Glass substrate: 0.7 mm in thickness (available from Corning, New York, USA).

Through-hole substrate: AAO through-hole membranes with a diameter of 13 mm, a thickness of 60 μm, and average pore size (i.e., channel diameter) of 20, 100 and 200 nm (available from Whatman, UK).

Conductive polymer: poly(3,4-ethylenedioxythiophene)-poly(styrene sulfonate) (PEDOT:PSS, AI4083) solution, available from UNI-Onward Corp. (Taiwan).

Conductive metal: silver (Ag), available from Sigma Aldrich (USA).

Fluid sensing material: P3HT, supplied by UNI-Onward Corp. (Taiwan).

Solvent: chlorobenzene, available from Sigma Aldrich (USA).

All the chemicals can be used readily in the experiment without purification.

Instruments

Thermal evaporator: Syskey, TH-SS150-A01.

Spin coater: SWIENCO (Taiwan).

Scanning electron microscope (SEM): Phenom ProX.

Atomic force microscope (AFM): Bruker.

Mass flow controller: Alicat Scientific and Aalborg Instruments, Model GFC 17.

Class IV laser machine: FLM Fiber Laser, SPI-20W.

Optical microscope: OLYMPUS BH2.

Source meter unit (SMU): Tektronix Keithley, 2401.

Digital dry box: SAMURAI, GP5-30L.

Glove box: MBRAUN UNIlab, Model PLUS.

3D printer: Model 3, Ultimaker, 3D Mart (Taiwan).

Manufacture of Two-Way Fluid Sensing Device

First, an Ag thin film (conductive metal layer) with a thickness of 200 nm are deposited respectively on a glass substrate and a through-hole substrate (with an average channel diameter of 100 nm) in a thermal evaporator at a vacuum level of less than $8 \times 10^{-6}$ Torr. Next, a PEDOT:PSS coating layer (conductive polymer layer) with a thickness of 50 nm is formed by spin-coating a PEDOT:PSS solution on the substrates deposited with the Ag thin film thereon at a rotation speed of 3000 rpm for 90 seconds using a spin coater.

Then, the substrates including the Ag thin film and the PEDOT:PSS coating layer are annealed at 120° C. for 20 min. After that, the layer including Ag and PEDOT:PSS are etched by fiber laser with a wavelength of 1064 nm using a class IV laser machine to form interdigitated electrodes.

Then, at room temperature)(23° C., 0.1 mg of P3HT was dissolved in 100 μL of chlorobenzene solution and then sonicated for 30 min to prepare a solution of fluid sensing material. Finally, a P3HT coating layer (fluid sensing layer) with a thickness of 15 to 20 nm is formed by spin-coating the prepared solution of fluid sensing material on the substrate formed with the interdigitated electrodes at a rotation speed of 1000 rpm for 40 seconds using a spin coater.

Specifically, the purpose of applying a PEDOT:PSS coating layer on the conductive metal layer (Ag thin film) before electrode patterning is to improve the electrical connection (hole-transporting) between the fluid sensing layer (P3HT layer) and the conductive metal layer.

In order to improve the throughput in manufacturing, in the manufacture of the interdigitated electrodes, a high-speed laser patterning process is adopted instead of quite complicated and expensive photolithography.

Porous Structure of Through-Hole Substrate

Figure 7A:
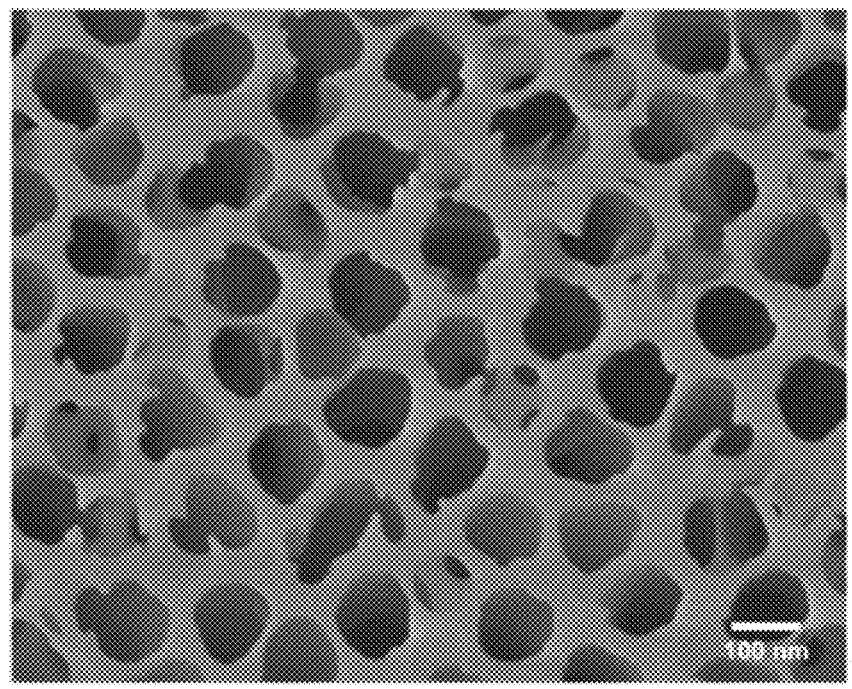
FIGS. 7A and 7B are scanning electron microscopy images of the top and cross-sectional structures of the through-hole substrate used in the present invention, respectively (with a channel diameter of 100 nm)
Figure 7B:
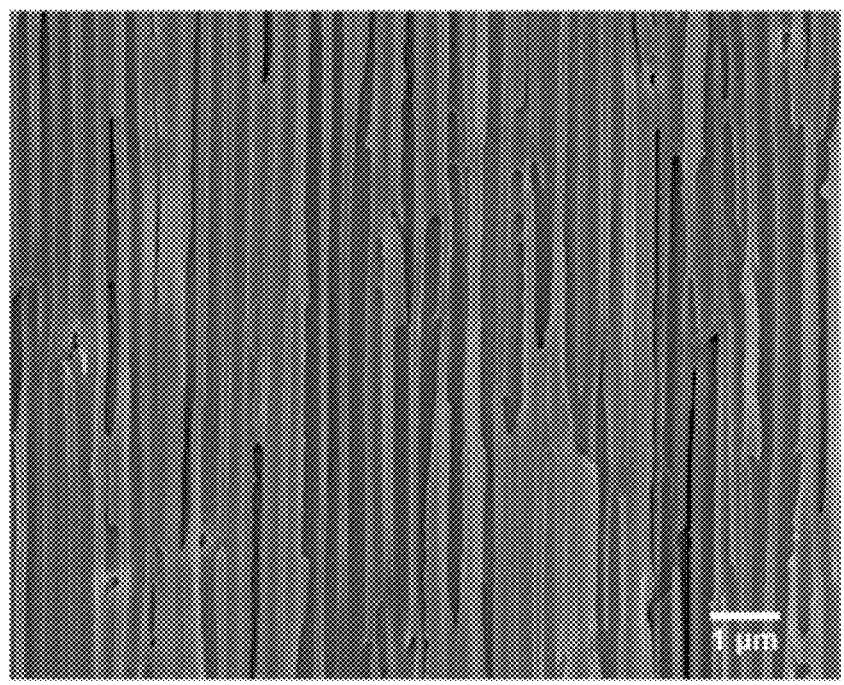
Figure 7C:
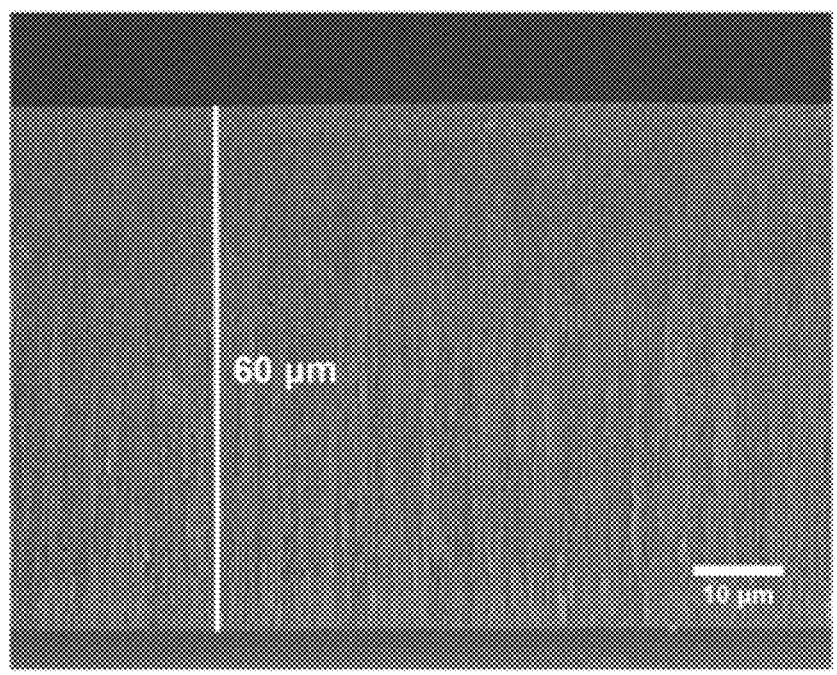
FIG. 7C is a scanning electron microscope image of the cross-sectional structure of the through-hole substrate used in the present invention, wherein the thickness of the through-hole substrate is shown (with a channel diameter of 100 nm)

The porous structure of the through-hole membrane as the substrate was analyzed by FE-SEM, the results are shown in FIGS. 7A to 7C.

As can be seen from FIGS. 7A to 7C, the surface of the through-hole membrane used in the present invention includes a hexagonal close-packed array of nanoporous channels, wherein the nanoporous channels have an average diameter of about 100 nm and a length of 60 μm, and penetrate from the top surface to the bottom surface of the through-hole membrane.

Figure 7D:
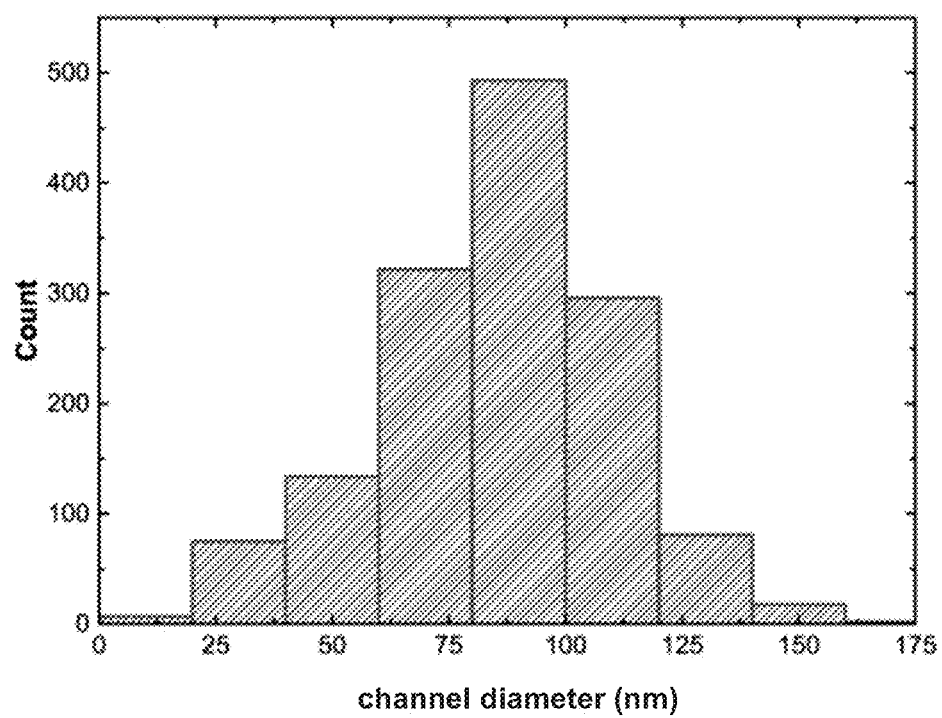
FIG. 7D illustrates the channel diameter distribution diagram of the through-hole substrate used in the present invention.

FIG. 7D illustrates the channel diameter distribution diagram of the through-hole membrane used in the present invention. As can be seen from FIG. 7D, the maximum distribution of the channel diameter the through-hole substrate used in the present invention falls between 80 and 100 nm.

Shape and Size of Interdigitated Electrodes

Figure 8B:
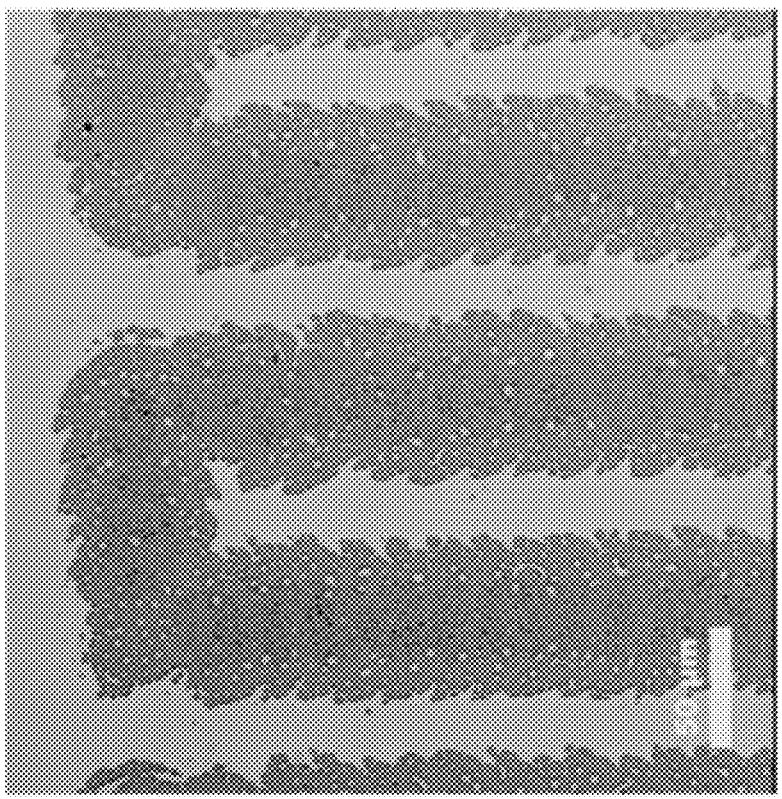
FIGS. 8A and 8B are SEM images of the interdigitated electrode structures on the substrates according to the comparative example and the inventive example, respectively.
Figure 8A:
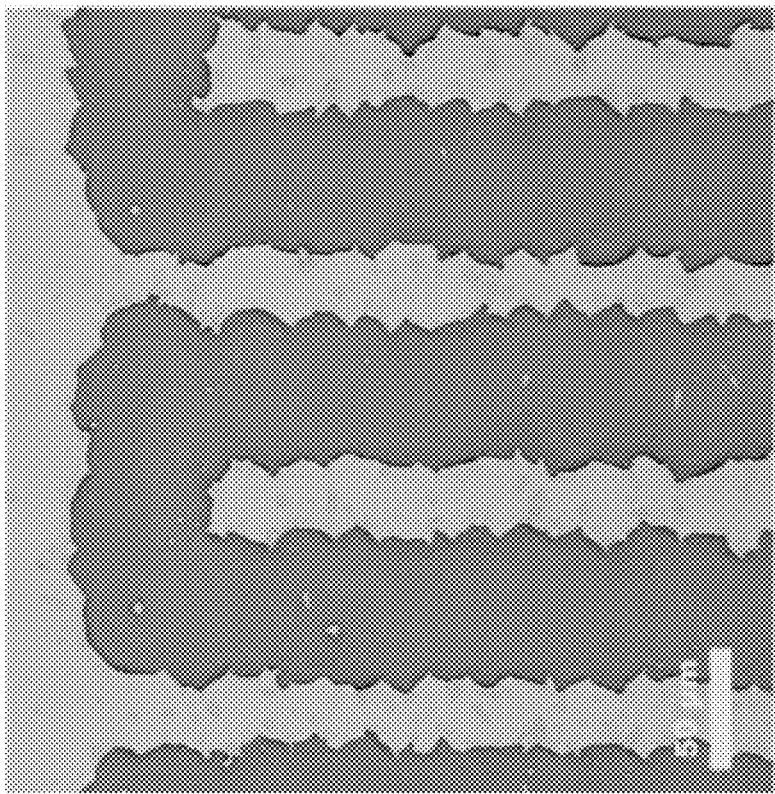
Figure 9B:
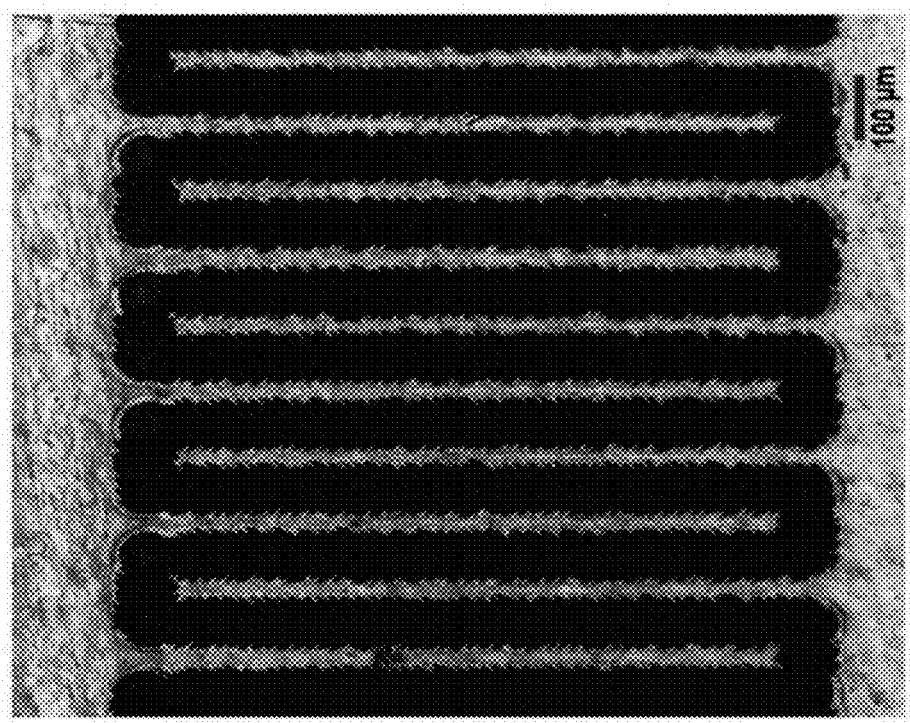
FIGS. 9A and 9B are optical microscopic images of the interdigitated electrode structures on the substrates according to the comparative example and the inventive example, respectively.
Figure 9A:
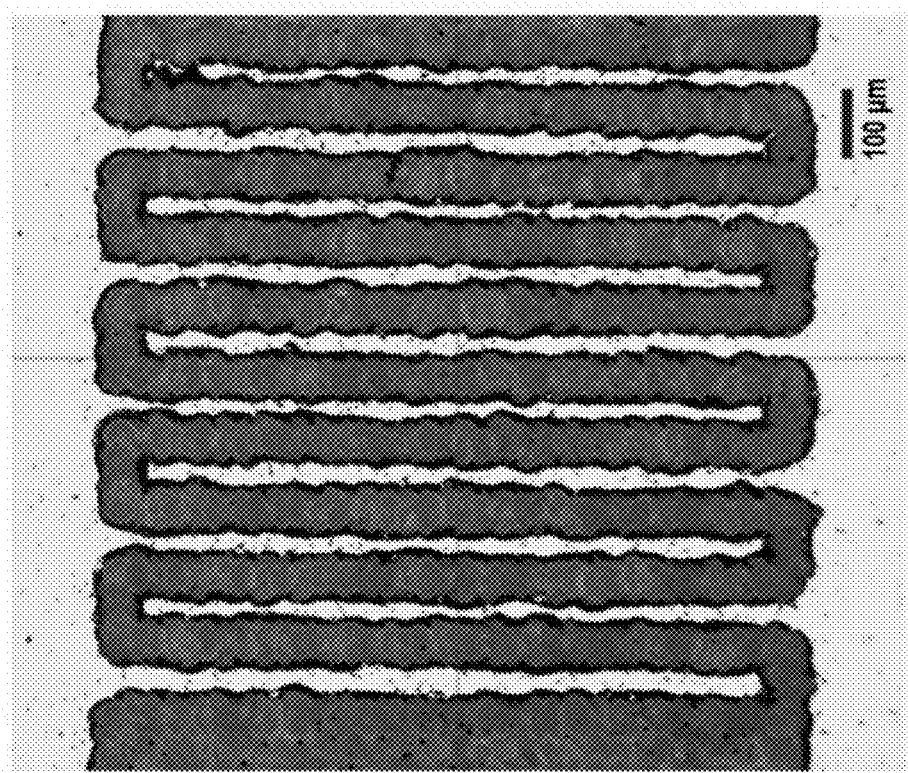

The shape and size of the interdigitated electrodes on the substrates according to the comparative example and the inventive example are analyzed by SEM and optical microscopy. FIGS. 8A and 8B are SEM images of the interdigitated electrode structures on the glass substrate and on the through-hole substrate, respectively. FIGS. 9A and 9B are optical microscopic images of the interdigitated electrode structures on the glass substrate and on the through-hole substrate, respectively.

As can be seen from the SEM images of FIGS. 8A and 8B, the interdigitated electrode layers including the Ag thin film and the PEDOT:PSS coating layer have obvious laser ablated zones, which show the successful formation of the interdigitated structures separated from each other on the glass substrate and the through-hole substrate. The nonporous structures of the surface of the through-hole substrate are exposed in the laser ablated zone, which confirms that there is no electrical short between the interdigitated electrodes.

The significant difference in the shape of the laser ablated zones on the glass substrate and on the through-hole substrate arises from the difference between the surfaces of the two substrates, that is, the glass substrate has a smooth surface, while the surface of the through-hole substrate includes the hexagonal close-packed array of nanoporous channels, as described above.

Further, as can be seen from the optical microscope images of FIGS. 9A and 9B, single interdigitated structure of the interdigitated electrodes on the glass substrate and on the through-hole substrate have a length of about 1 mm and a width of about 20 μm, while the space between adjacent interdigitated structures are 80 μm.

By comparing FIGS. 9A and 9B, it can be seen that the width of the interdigitated structures of the interdigitated electrode fabricated on the through-hole substrate is more uniform than that fabricated on the glass substrate, this is because the porous structure of the through-hole substrate promotes heat dissipation. It is noted that the laser power used to form a similar electrode pattern on the through-hole substrate is reduced by about 25% compared to that on the glass substrate.

Surface Morphology of Ag Thin Films

Figure 10A:
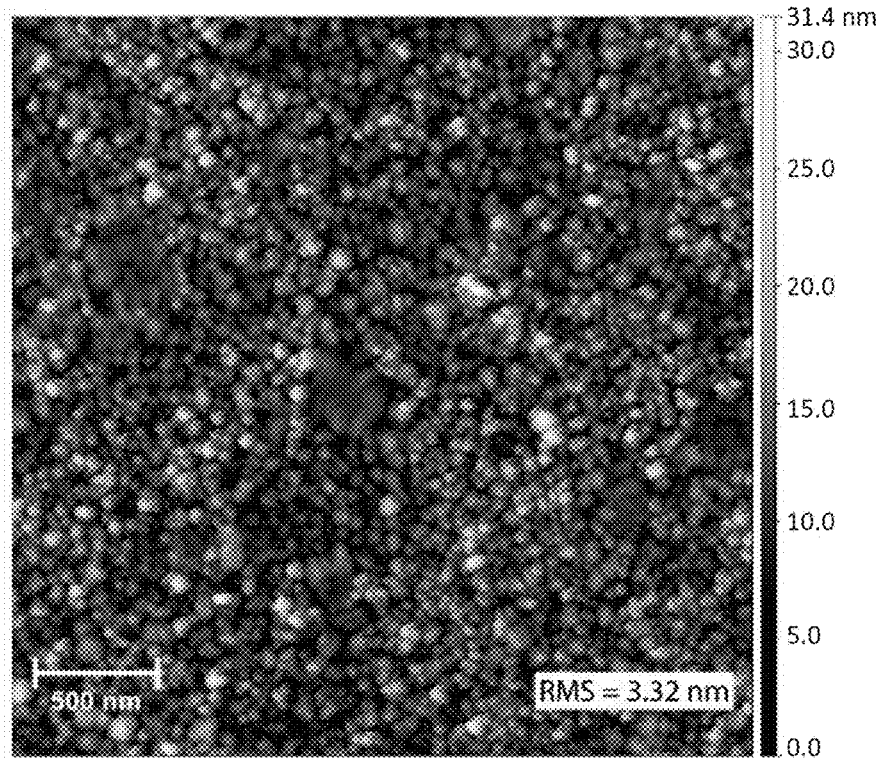
FIGS. 10A and 10B are atomic force microscopic images of the surface of the Ag thin film according to the comparative example and the inventive example, respectively.
Figure 10B:
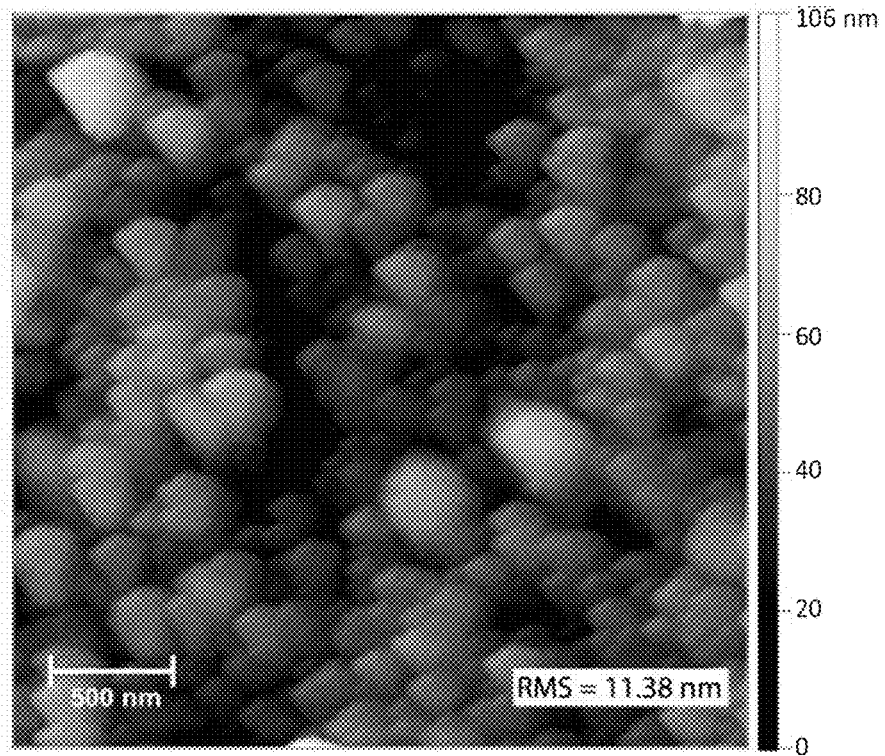

Before applying the PEDOT:PSS coating layer on the Ag thin film, the surface morphology of the Ag thin film on the glass substrate and on the through-hole substrate was analyzed by AFM, the results are shown in FIGS. 10A and 10B, respectively.

By analyzing the results of FIGS. 10A and 10B, it can be seen that the (RMS) surface roughness of the Ag thin film on the through-hole substrate (11.38 nm) is higher than that on the glass substrate (3.32 nm), such difference confirms the difference in interdigitated patterns on the glass substrate and on the through-hole substrate observed from FIGS. 8A and 8B and FIGS. 9A and 9B. That is, the porous structure of the through-hole substrate causes the relatively rough surface of the Ag thin film, which promotes heat dissipation, thereby resulting more uniform width of the interdigitated structures.

Specifically, the growth of the Ag thin film (Volmer-Weber mode) on the glass substrate exhibits a particle size of about 50 nm in average diameter, so that the surface of the Ag thin film is relative smooth. On the other hand, a larger particle size is exhibited on the through-hole substrate, which has an average diameter of about 220 nm, so that the surface of the Ag thin film is relatively rough.

Surface Morphology of P3HT Layer

Figure 11A:
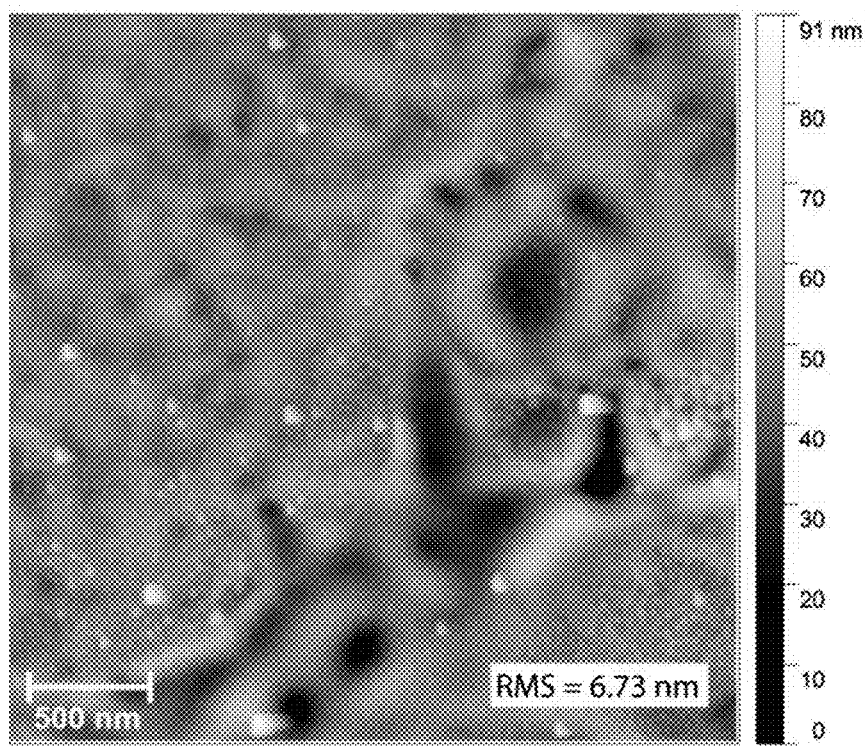
FIGS. 11A and 11B are atomic force microscopic images of the surface of the P3HT layer according to the comparative example and the inventive example, respectively.
Figure 11B:
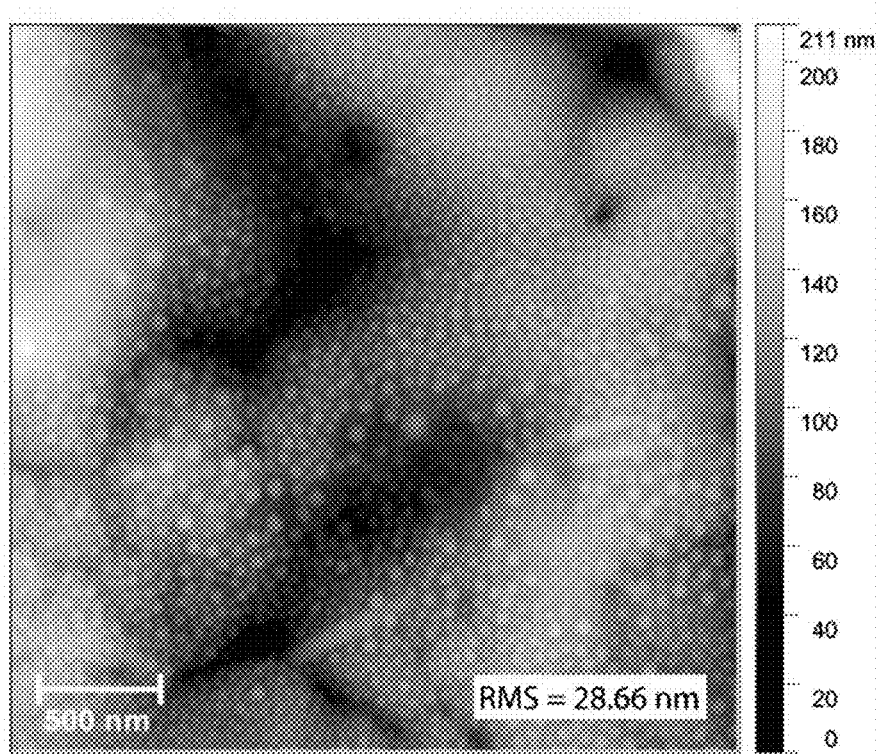

The surface morphologies of the P3HT layers according to the comparative examples and the inventive examples are analyzed by AFM, the results are shown in FIGS. 11A and 11B, respectively.

By analyzing the results of FIGS. 11A and 11B, it can be seen that the RMS surface roughness of the P3HT layer on the through-hole substrate (28.66 nm) is higher than that on the glass substrate (6.73 nm).

The difference in RMS surface roughness of both the Ag thin film and the P3HT layer on the glass substrate and on the through-hole substrate arises from the difference in surface roughness of the glass substrate and the through-hole substrate.

Performance Evaluation of Fluid Sensing Device

Figure 12:
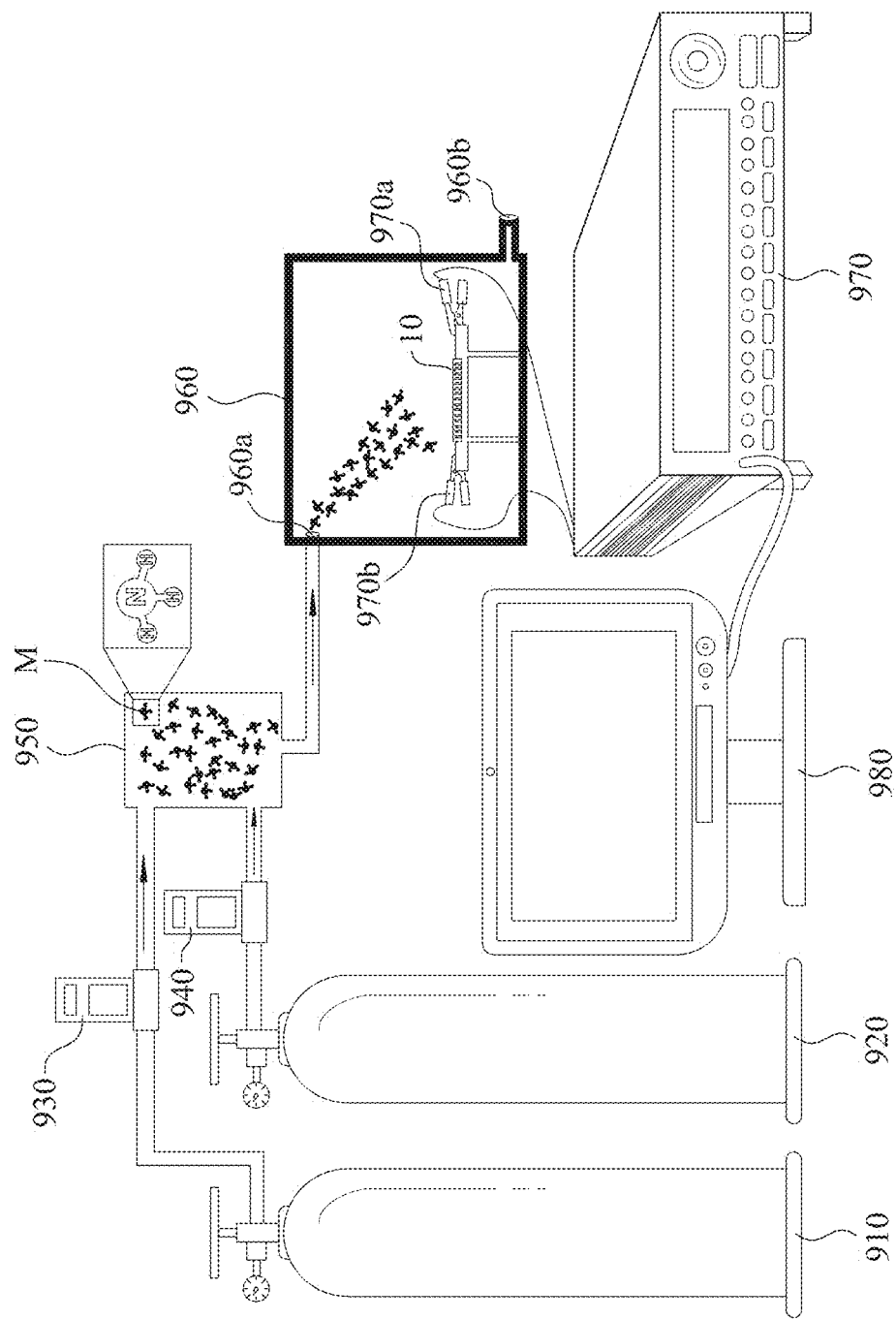
FIG. 12 illustrates a diagram of the experimental equipments used for performance evaluation of the fluid sensing devices.

The experimental equipments used for performance evaluation of the fluid sensing devices are shown in FIG. 12. All experimental measurements and data acquisitions were controlled by LabVIEW software designed by National Instruments. In the drawing of the present invention, the error bars reflect the variation (standard deviation) of the response data collected from 10 samples. All tests below are performed at room temperature (23° C.), unless otherwise indicated.

First, at room temperature (23° C.), the feed amounts of $NH_3$ and $N_2$ are controlled respectively by mass flow controllers 930 and 940 to feed $NH_3$ and $N_2$ from gas cylinders 910 and 920 into a mixing chamber 950, so as to prepare specific concentrations of ppb and ppm level $NH_3$ fluid without passing through water vapor.

Then, the prepared ammonia fluid is transported from the mixing chamber 950 to a sample chamber 960 loaded with a sample to be tested (i.e., the fluid sensing device 10), such that the fluid sensing device 10 is exposed to an environment with a specific concentration of ammonia fluid. In the sample chamber 960 (home-built by 3D printer) having fluid inlet 960a and fluid outlet 960b, two interdigitated electrodes of the fluid sensing device 10 are respectively connected to a source meter unit (SMU) 970 via two connectors 970a and 970b, and a certain bias voltage is applied to the fluid sensing device 10, so as to measure the current-voltage (I-V) characteristics of the fluid sensing device 10 at room temperature (23° C.). The SMU 970 is connected to an oscilloscope 980 to display the measured I-V curves on the oscilloscope 980.

At room temperature (23° C.), under the circumstances that the sample chamber 960 is filled with ambient air, and $NH_3$ concentrations in the sample chamber 960 ranges from 1 to 100 ppm, respectively, the current passing through the P-type P3HT semiconductor layer of the fluid sensing device 10 was measured at a bias voltage of −5V to +5V. The measured I-V curves of the fluid sensing device 10 of the present invention are recorded in FIG. 13A.

Figure 13B:
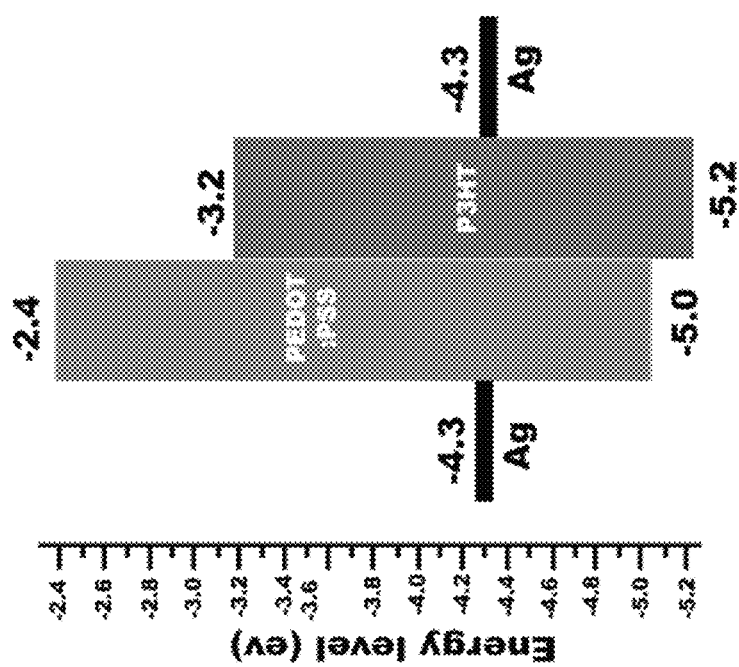
FIG. 13B shows the energy band diagram of respective materials of the two-way fluid sensing device of the present invention.
Figure 13A:
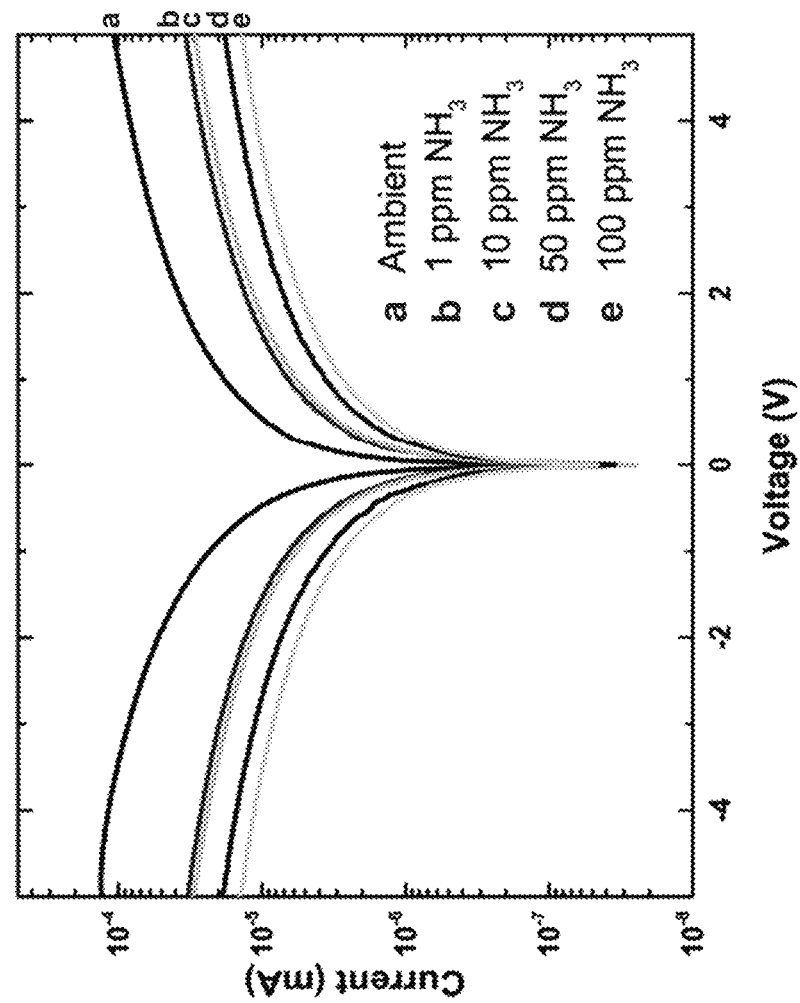
FIG. 13A shows the current-voltage characteristic curves of the two-way fluid sensing device of the present invention at various $NH_3$ concentrations.

As can be seen from the results of FIG. 13A, a decrease in current was observed in the presence of $NH_3$, and the decreasing extent in current increases as $NH_3$ concentration increases. The decreasing in current i.e., decreasing in charge transportation, in this P-type organic semiconductive layer (i.e., P3HT layer) arises from the reduction in hole mobility due to the charge-dipole interaction between the P3HT molecules and the adsorbed $NH_3$ molecules.

The electrical characteristic of the I-V curves shown in FIG. 13A indicates that a good ohmic contact is formed between the P3HT layer and the Ag layer via the PEDOT:PSS layer, which can be confirmed by the energy band diagram of respective materials of the fluid sensing device 10 of the present invention as shown in FIG. 13B.

a. Response

Figure 14A:
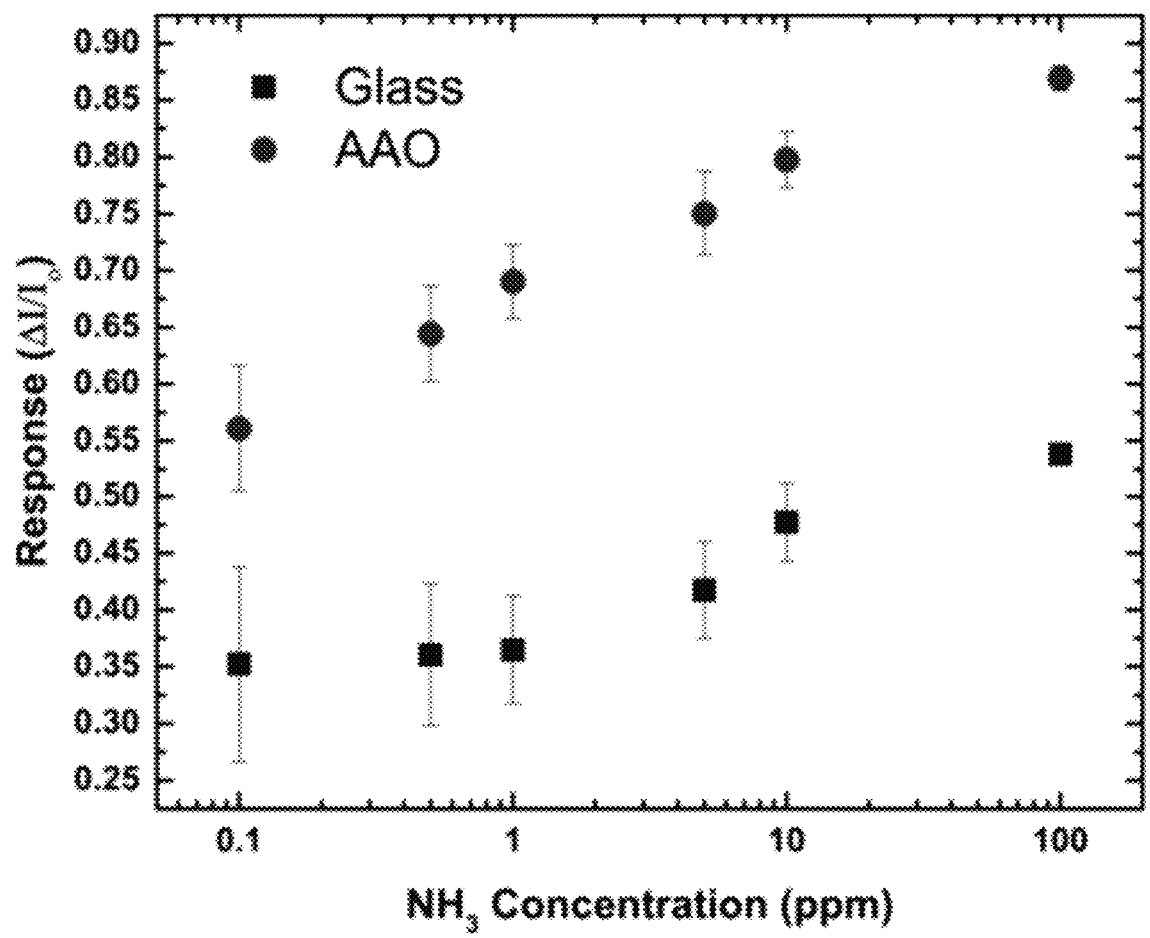
FIG. 14A shows the response of the fluid sensing devices according to the comparative example and the inventive example at various $NH_3$ concentrations.

The charge-dipole interaction between the $NH_3$ fluid and the P3HT layer of the fluid sensing device are studied by measuring the response of the fluid sensing device according to the comparative example and the inventive example at various $NH_3$ concentrations, the results are shown in FIG. 14A. In the drawings, "Glass" represents the fluid sensing device based on the glass substrate according to the comparative example, and "AAO" represents the fluid sensing device based on the AAO through-hole substrate according to the inventive example.

The current passing through the P3HT layer was measured at specific applied bias voltages, and the response of the fluid sensing device is calculated as $\Delta I/I_0$, wherein $\Delta I = I_c - I_0$, $I_c$ is the measured currents passing through the P3HT layer under the exposure of $NH_3$ at a certain concentration "c", and $I_0$ is the current passing through the P3HT layer in absence of $NH_3$ fluid, that is, in atmospheric environment (which is simulated by a sample chamber filled with ambient air).

As shown in FIG. 14A, at a bias voltage of 0.5V and different $NH_3$ concentrations ranging from 100 ppb to 100 ppm, the fluid sensing device of the inventive example exhibits a considerably high response (increased by nearly 60% compared to the comparative example) compared to the fluid sensing device of the comparative example. The very high response of the fluid sensing device of the inventive example may be due to the increased interaction area between the analyte ($NH_3$) and the indicator (P3HT), since the surface roughness of the top surface of the P3HT layer is increased due to the porous structure of the through-hole substrate, thereby increasing the interaction area.

As can be seen from the results in FIG. 14A, the response of the fluid sensing device will vary as $NH_3$ concentration changes. Therefore, the concentration of a specific fluid (e.g., $NH_3$) in a specific environment can be converted from the calculated response of the fluid sensing device by the methods well known in the art. For example, the concentration of the specific fluid can be converted from the calculated response by a lookup table, a functional relation, or a relation curve of the response and the concentration of the specific fluid.

Figure 14B:
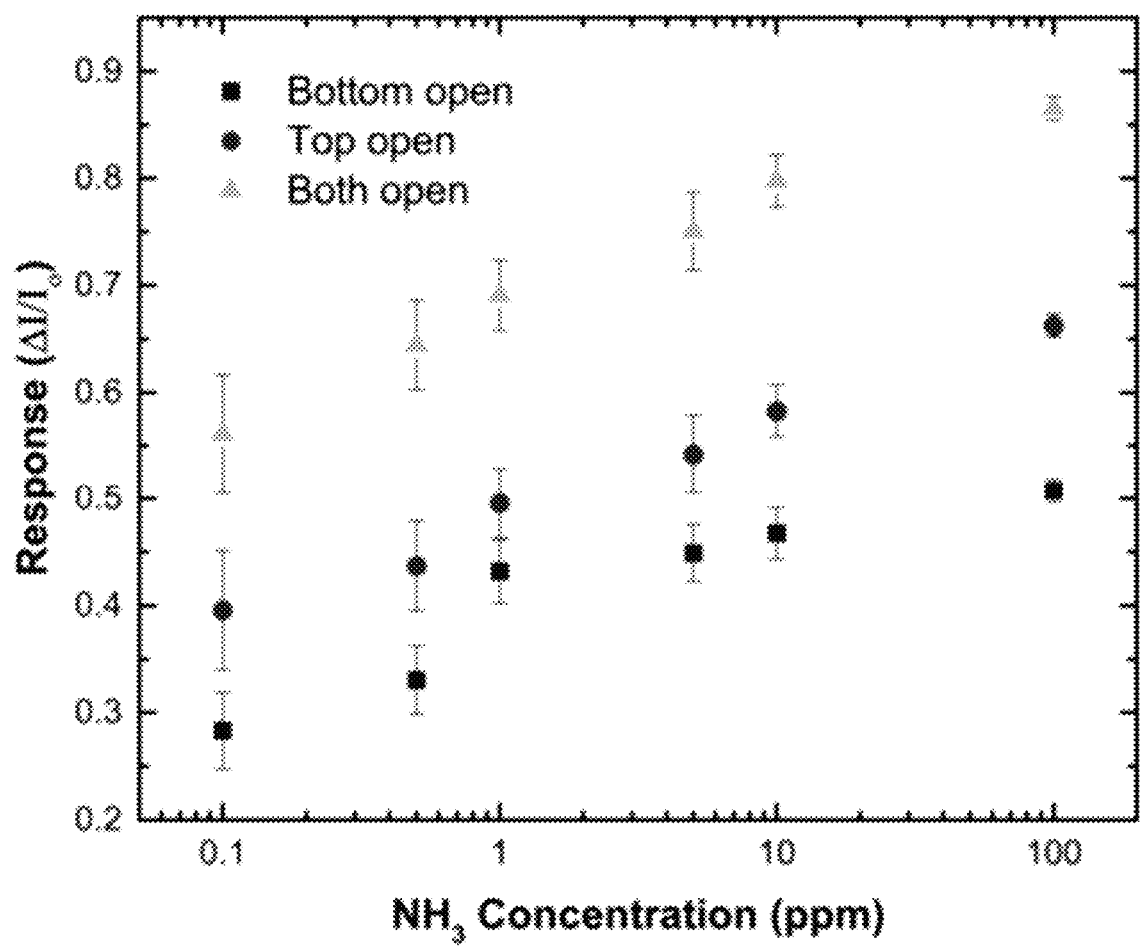
FIG. 14B shows the response of the fluid sensing device of the present invention under the conditions that the bottom side is open, the top side is open, or both sides are open.

In addition, the porous structure of the through-hole substrate also allows fluid molecules to contact the bottom surface of the P3HT layer from the bottom side of the through-hole substrate through the nanochannels and the gaps between the interdigitated structures of the interdigitated electrodes. In order to confirm this conjecture, the top and bottom sides of the fluid sensing device of the present invention are respectively covered (sealed with a glass base material and transparent tape), and the response of the fluid sensing device is measured and compared with the response of the fluid sensing device where both sides are opened, the results are shown in FIG. 14B.

As expected, at 100 ppb of $NH_3$ concentration, the fluid sensing device where the bottom side is opened (Bottom open) shows a lowest response (0.28), since the fluid molecules are confined to only can interact with the bottom surface of the P3HT layer through the nanochannels and the interdigitated electrodes; the fluid sensing device where the top side is opened (Top open) shows a relatively high response (0.39), since the fluid molecules can contact the whole top surface of the fluid sensing device and thus the interaction area is increased; while the fluid sensing device wherein both sides are opened (Both open) shows a highest response (0.56), because the fluid molecules are allowed to contact the P3HT layer from both sides, respectively, which confirms the above conjecture.

Furthermore, for the fluid sensing device of the present invention, the enhanced response is mainly because the fluid molecules can contact the fluid sensing layer from both sides and promote the interaction, compared to the increased surface area of the fluid sensing layer due to the use of the through-hole membrane as the substrate. Compared to the fluid sensing device of the comparative example, the increasing extent of the response of the fluid sensing device of the present invention where the top side is opened is not obvious (only increased by 11%), while the fluid sensing device of the present invention where both sides are opened is greatly increased (increased by 60%). This observation indicates that the surface area for interaction between the fluid sensing layer and the fluid molecules cannot be increased to an extent sufficient for causing sufficient response by utilizing the corrugated extent (surface roughness) of the fluid sensing layer only.

b. Sensitivity

Figure 15:
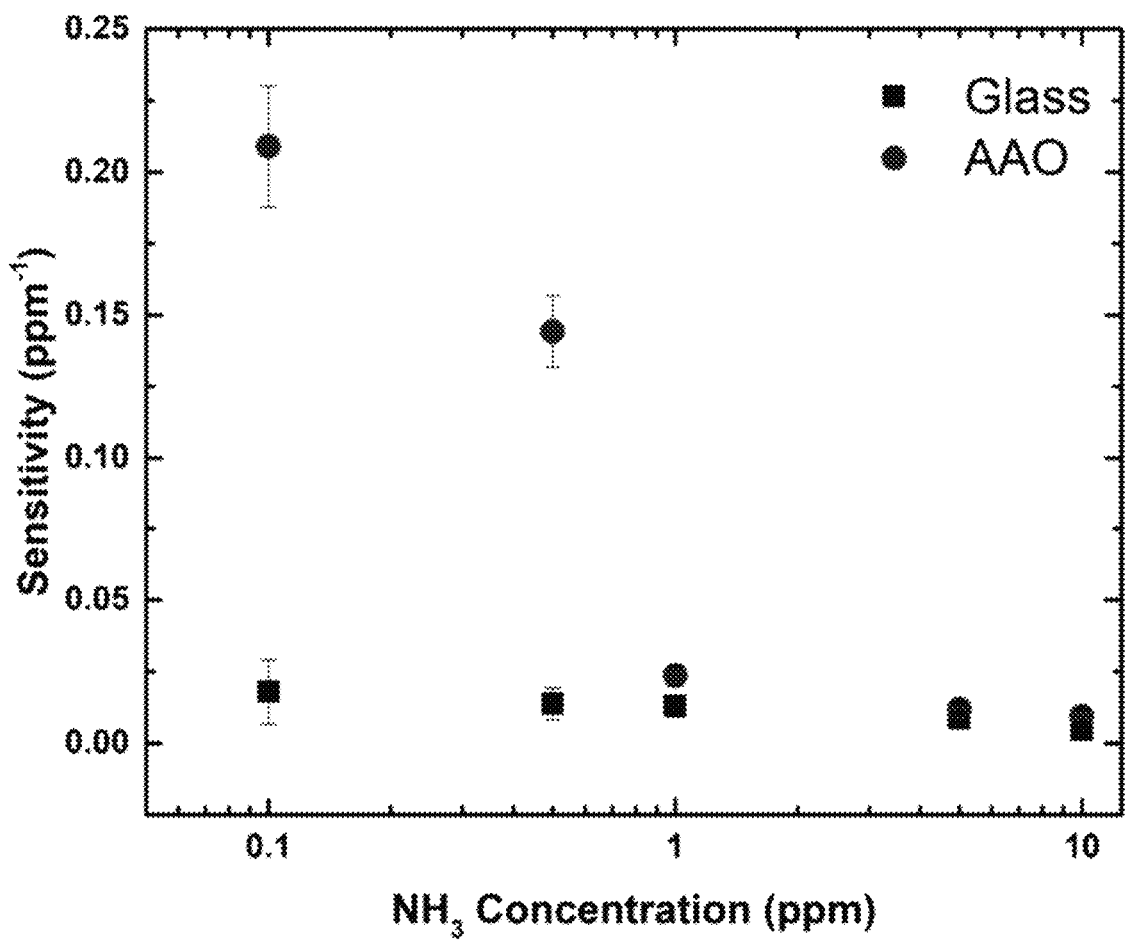
FIG. 15 shows the sensitivity of the fluid sensing device according to the comparative example and the inventive example at various $NH_3$ concentrations.

FIG. 15 shows the sensitivity of the fluid sensing device according to the comparative example and the inventive example at various $NH_3$ concentrations, wherein the sensitivity of the fluid sensing device is defined as the change in response (r) relative to $NH_3$ concentration (c), i.e., dr/dc. As can be seen from FIG. 15, at a $NH_3$ concentration lower than 10 ppm, the sensitivity of the fluid sensing device of the inventive example (AAO) increases slowly as the $NH_3$ concentration decreases, and then increases abruptly after the $NH_3$ concentration is lower than 1 ppm. At any concentration, the sensitivity of the fluid sensing device of the comparative example (Glass) is lower than that of the inventive example. Especially at a low $NH_3$ concentration of 100 ppb, the sensitivity of the inventive example (0.21 $ppm^{-1}$) is much higher than that of the comparative example (0.02 $ppm^{-1}$). It is noted that the difference in sensitivity of the fluid sensing devices according to the comparative example and the inventive example abruptly increases at lower $NH_3$ concentrations. In other words, the through-hole substrate based fluid sensing device is highly sensitive at lower $NH_3$ concentrations (<10 ppm) compared to the glass substrate based fluid sensing device.

c. Response Time

Figure 16:
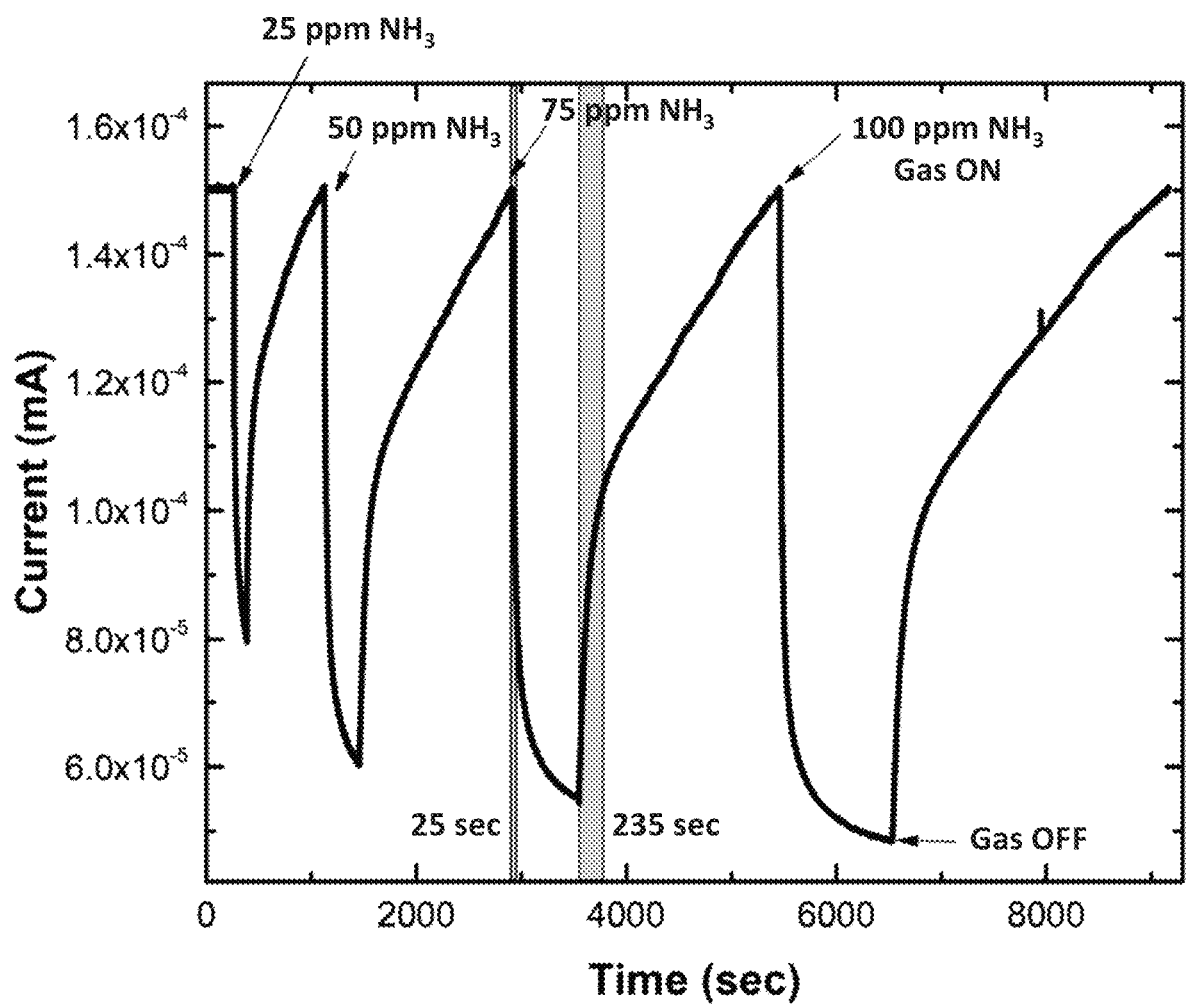
FIGS. 16 and 17 show the dynamic response of the fluid sensing devices of the inventive example and the comparative example at a bias voltage of 5V, respectively.
Figure 17:
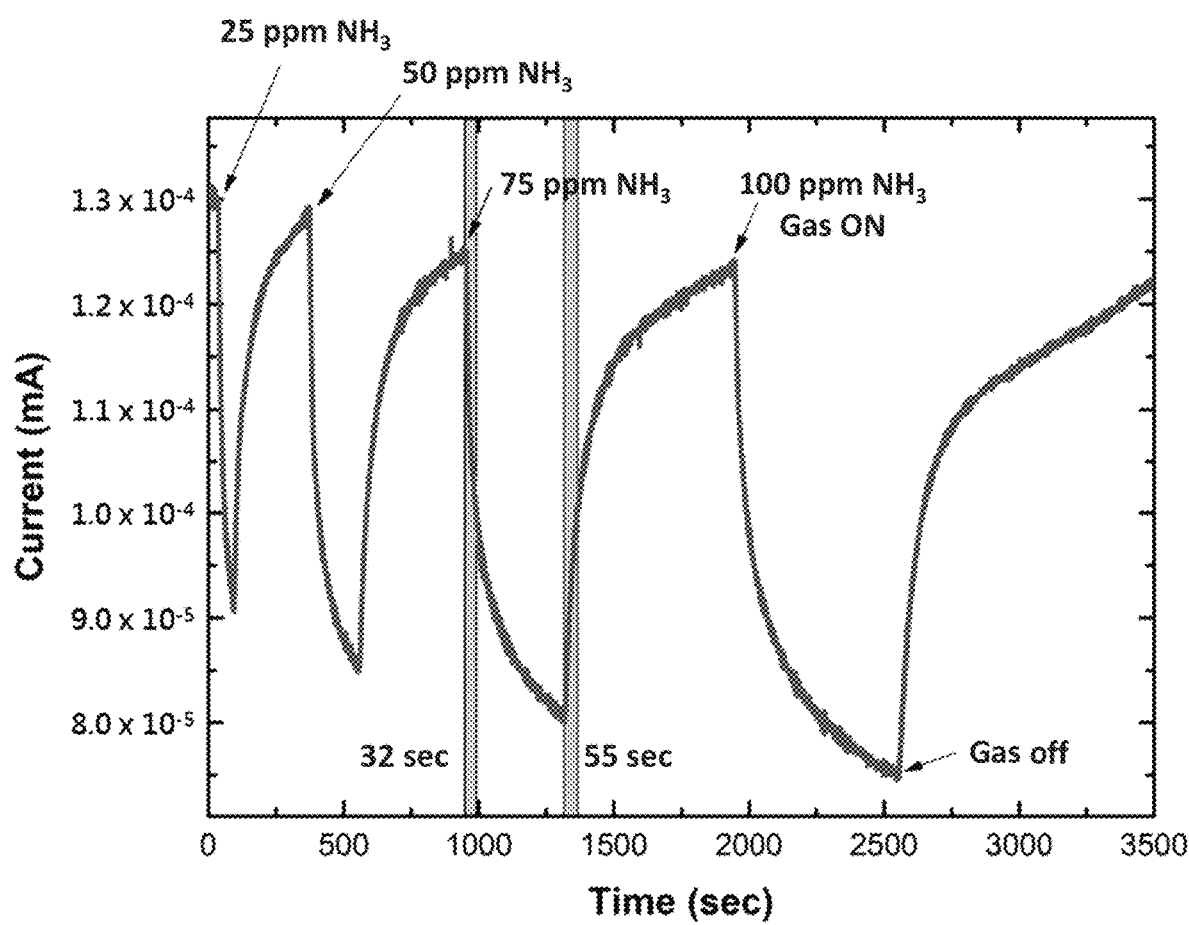

In order to evaluate the response time of the fluid sensing devices according to the inventive example and the comparative example, the dynamic response at a bias voltage of 5V are measured, the results are shown in FIGS. 16 and 17, respectively, Wherein the $NH_3$ fluid is periodically turned on and turned off with gradually increasing the $NH_3$ concentration each time the $NH_3$ fluid is turned on, and the dynamic response is measured. Response time is defined as the time taken by the fluid sensing device to reach 50% below the initial current when the fluid is turned on; while recovery time is defined as the time taken by the fluid sensing device to reach 50% above the initial current when the fluid is turned off.

As shown in FIG. 16, for the fluid sensing device of the inventive example, when the fluid is turned on, the current passing through the fluid sensing device drops abruptly, which shows a fast response time of 25 seconds; after the fluid is turned off, the fluid sensing device gradually recovers to the initial current level, and the recovery time was about 4 minutes. While as shown in FIG. 17, for the fluid sensing device of the comparative example, a response time (32 seconds) similar to that of the inventive example, and a faster recovery time (55 seconds) compared to that of the inventive example are measured. The relatively long recovery time of the through-hole substrate based fluid sensing devices is attributed to the confinement and slow diffusion of the fluid molecules inside the nanochannels.

d. Selectivity

In order to confirm the feasibility of the fluid sensing device of the present invention in practical application, selectivity tests for different interested fluid molecules are conducted. At a bias voltage of 5V, all purchased fluids are charged, without dilution with air (i.e., pure or mixed with $N_2$), into the sample chamber loaded with the fluid sensing device of the present invention, and the response of the fluid sensing device is measured.

Figure 18:
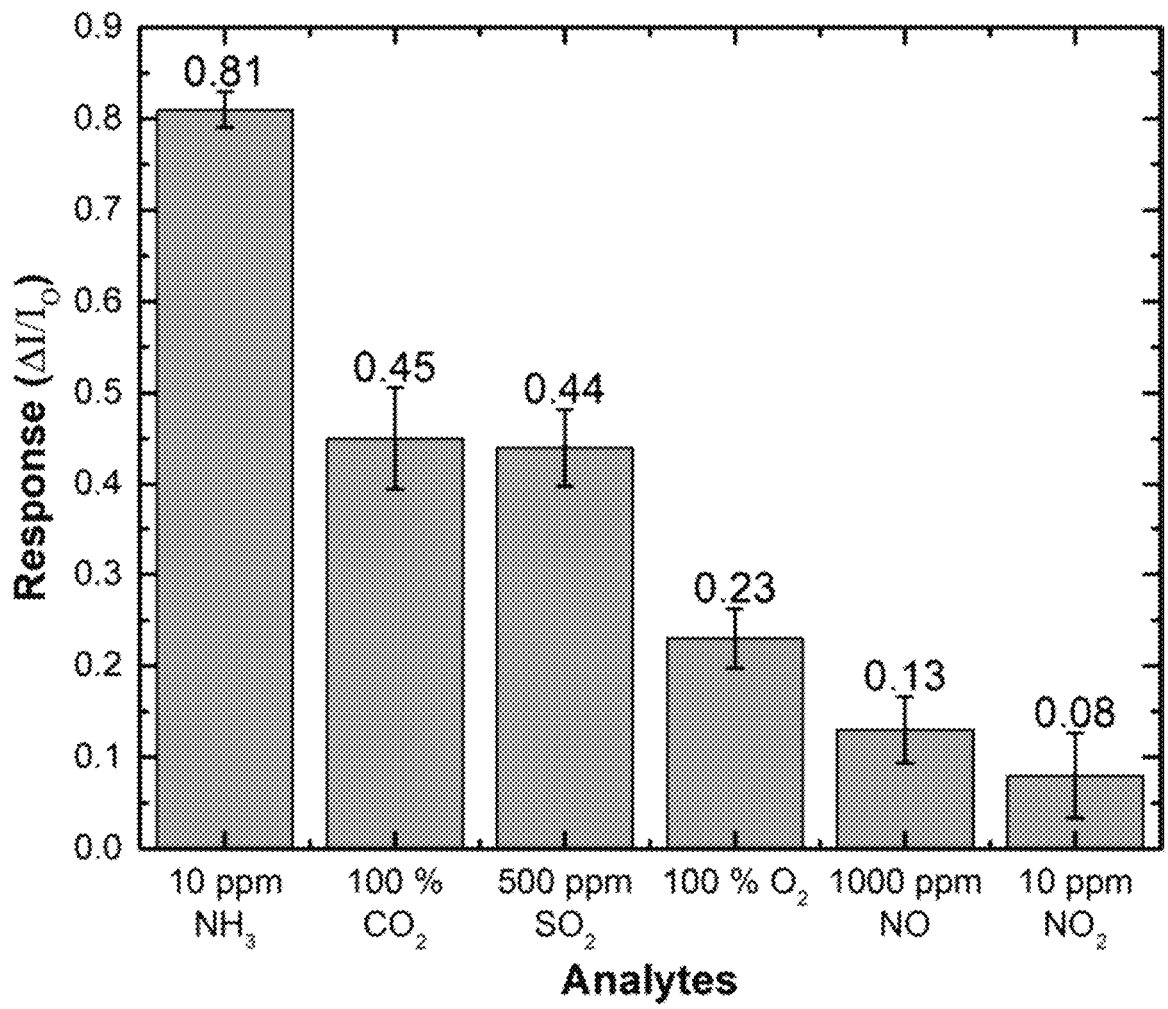
FIG. 18 shows the response of the fluid sensing device of the present invention to various fluids at specific concentrations.

As shown in FIG. 18, the response of the fluid sensing device of the present invention to various liquids at specific concentrations are as follows: the response to 100% of pure $O_2$ is 0.23; the response to 100% of pure $CO_2$ is 0.45; the response to 1000 ppm of NO is 0.13; the response to 10 ppm of $NO_2$ is 0.08; the response to 500 ppm of $SO_2$ is 0.44; the response to 10 ppm of $NH_3$ is 0.81 (which is the highest response among the various fluid molecules mentioned above).

Therefore, it is obvious that the fluid sensing device of the present invention is not only highly selective to $NH_3$ molecules, but also have quite responses to other fluid molecules, so that can be used as an effective sensing device for $NH_3$ or other fluids (such as $N_2$, NO, $NO_2$, $O_2$, $CO_2$, $SO_2$ or $H_2S$) in industrial or residential applications.

e. Reliability

In order to further confirm the practical applicability of the fluid sensing device of the present invention, reliability tests, such as lifetime measurements, are conducted at a bias voltage of 5V at different humidity and temperature.

Figure 19A:
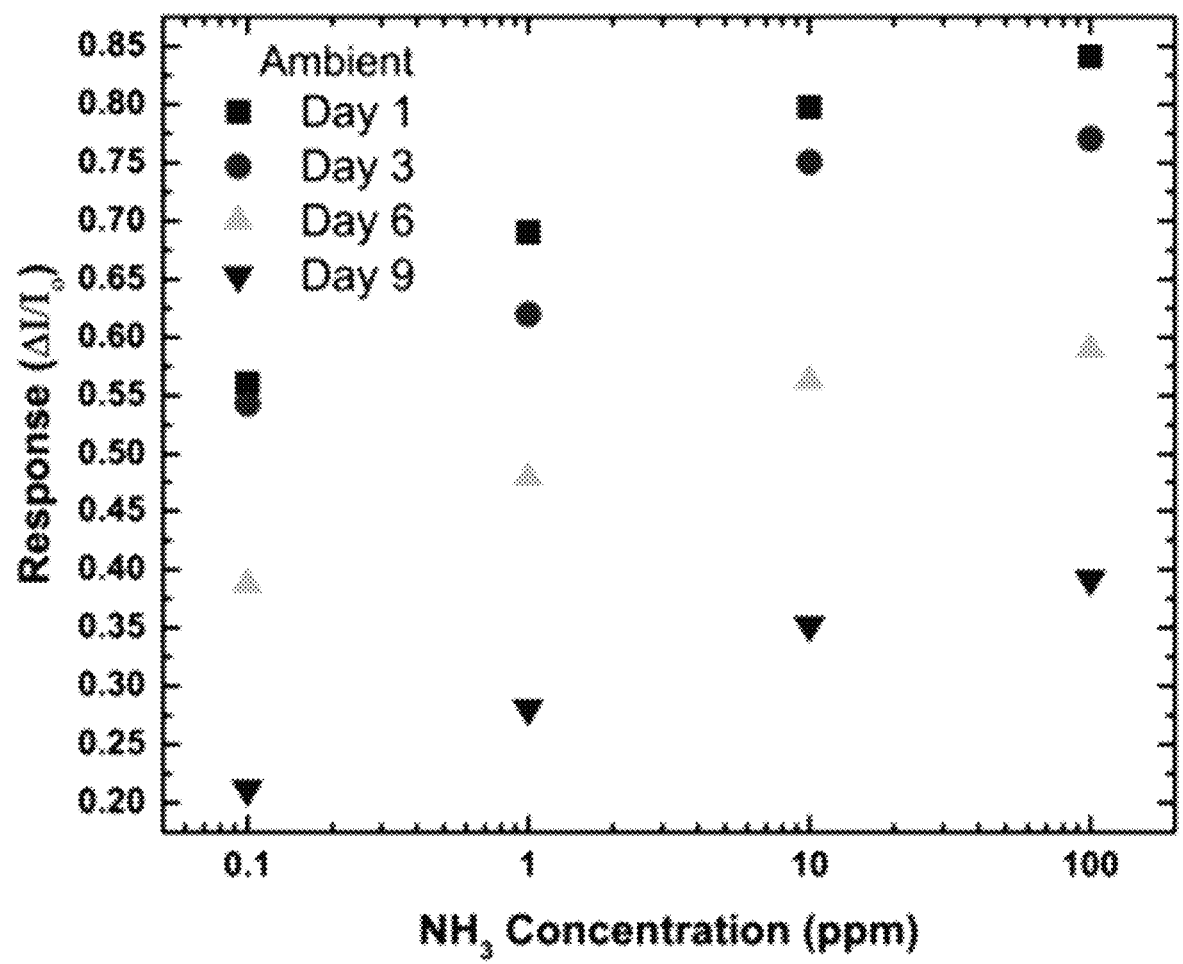
FIGS. 19A and 19B show the response of the fluid sensing device of the present invention preserved in atmospheric environment and in a glove box at intervals of few days, respectively.
Figure 19B:
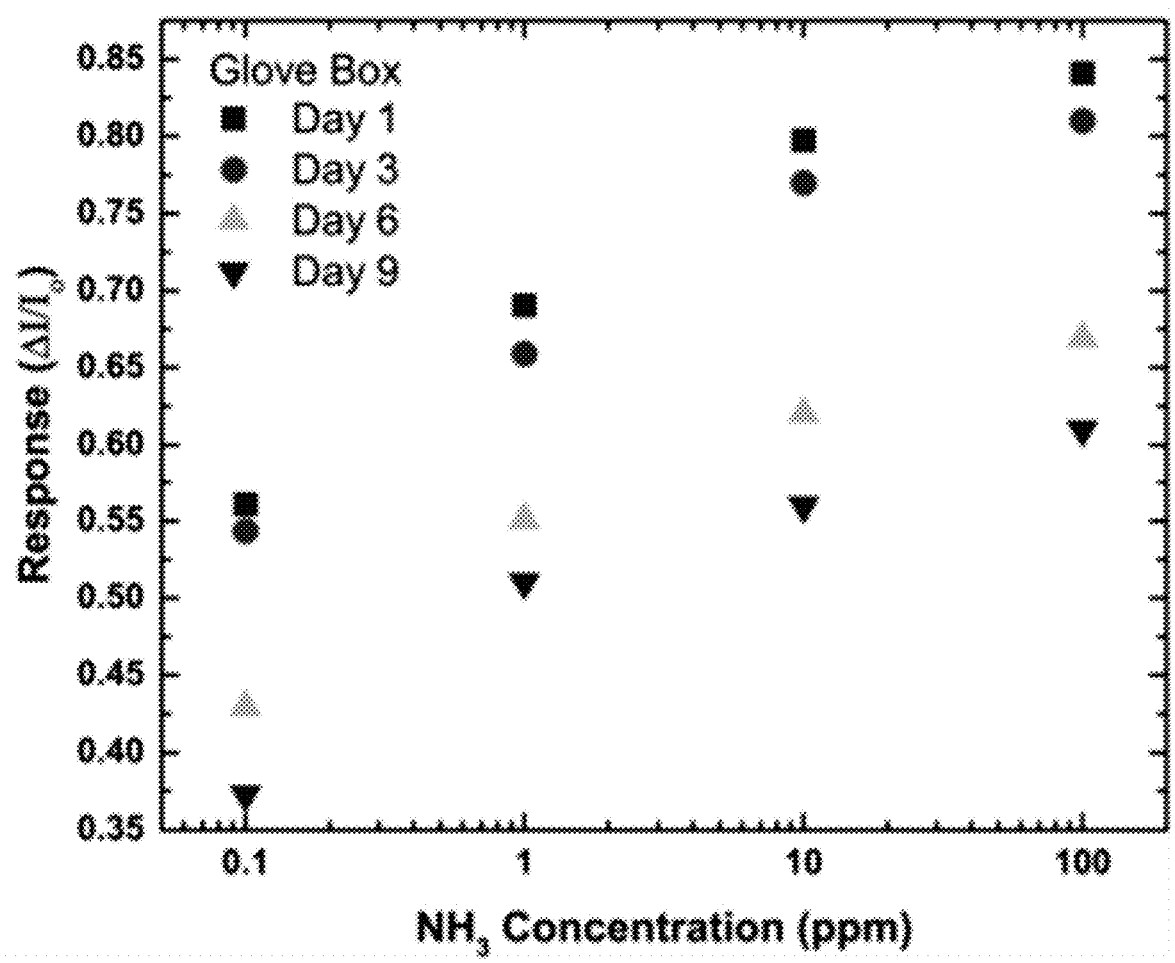

First, at room temperature (23° C.), the lifetime test is conducted by measuring the response of the fluid sensing device of the present invention preserved in atmospheric environment (RH 70 to 80% of humidity) and in a glove box (RH 20 to 30% of humidity, controlled by digital dry box) at intervals of few days, the results are shown in FIGS. 19A and 19B. Compared to the fluid sensing device preserved in the atmospheric environment (Ambient), the decreasing extent of response over time of the fluid sensing device preserved in the glove box (Glove Box) is relatively less. That is, the fluid sensing device preserved in the glove box has a longer lifetime.

Figure 20:
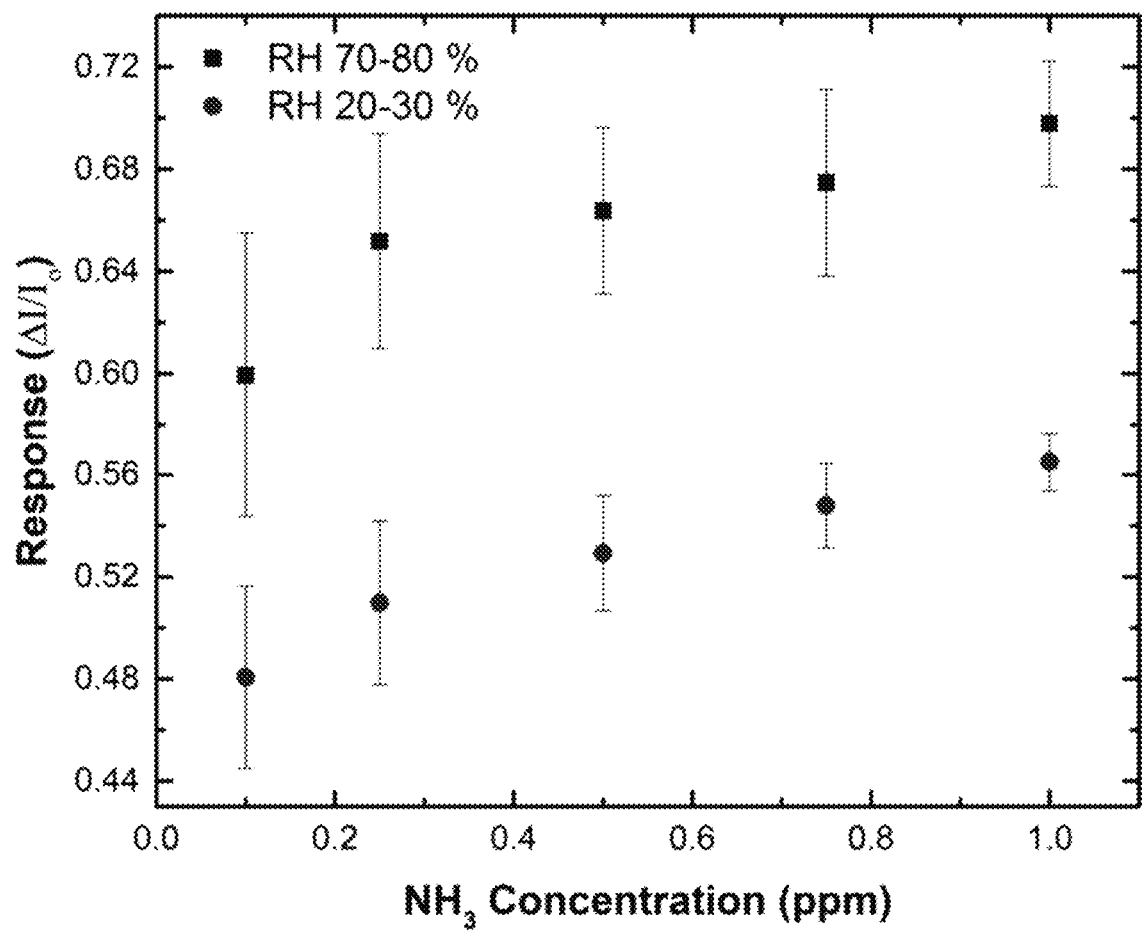
FIG. 20 shows the response of the fluid sensing devices of the present invention at different humidity.

FIG. 20 shows the response of the fluid sensing devices of the present invention at different humidity. As can be seen from FIG. 20, although at a lower humidity (RH 20 to 30%) relative to the humidity in atmospheric environment (RH 70 to 80%), the fluid sensing device of the present invention exhibits a lower response (the response to 100 ppb of $NH_3$ is 0.48), the response curves follows the same trend over the entire detection range, which indicates that the effect of humidity on sensitivity is minimal.

Figure 21:
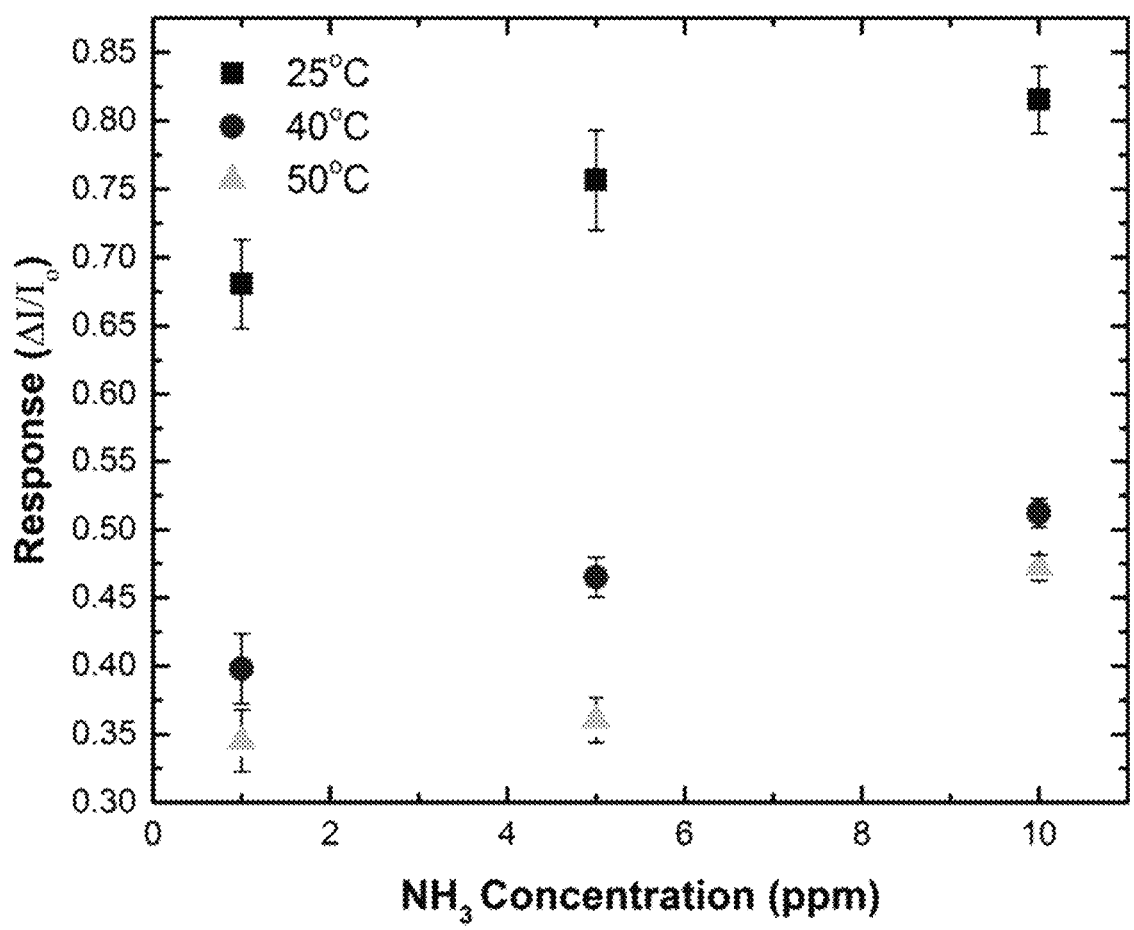
FIG. 21 shows the response of the fluid sensing devices of the present invention at different temperature.

FIG. 21 shows the response of the fluid sensing devices of the present invention at different temperature. Interestingly, the fluid sensing device of the present invention exhibits the highest response to $NH_3$ at various concentrations at room temperature (25° C.).

f. Overall Performance

Figure 22:
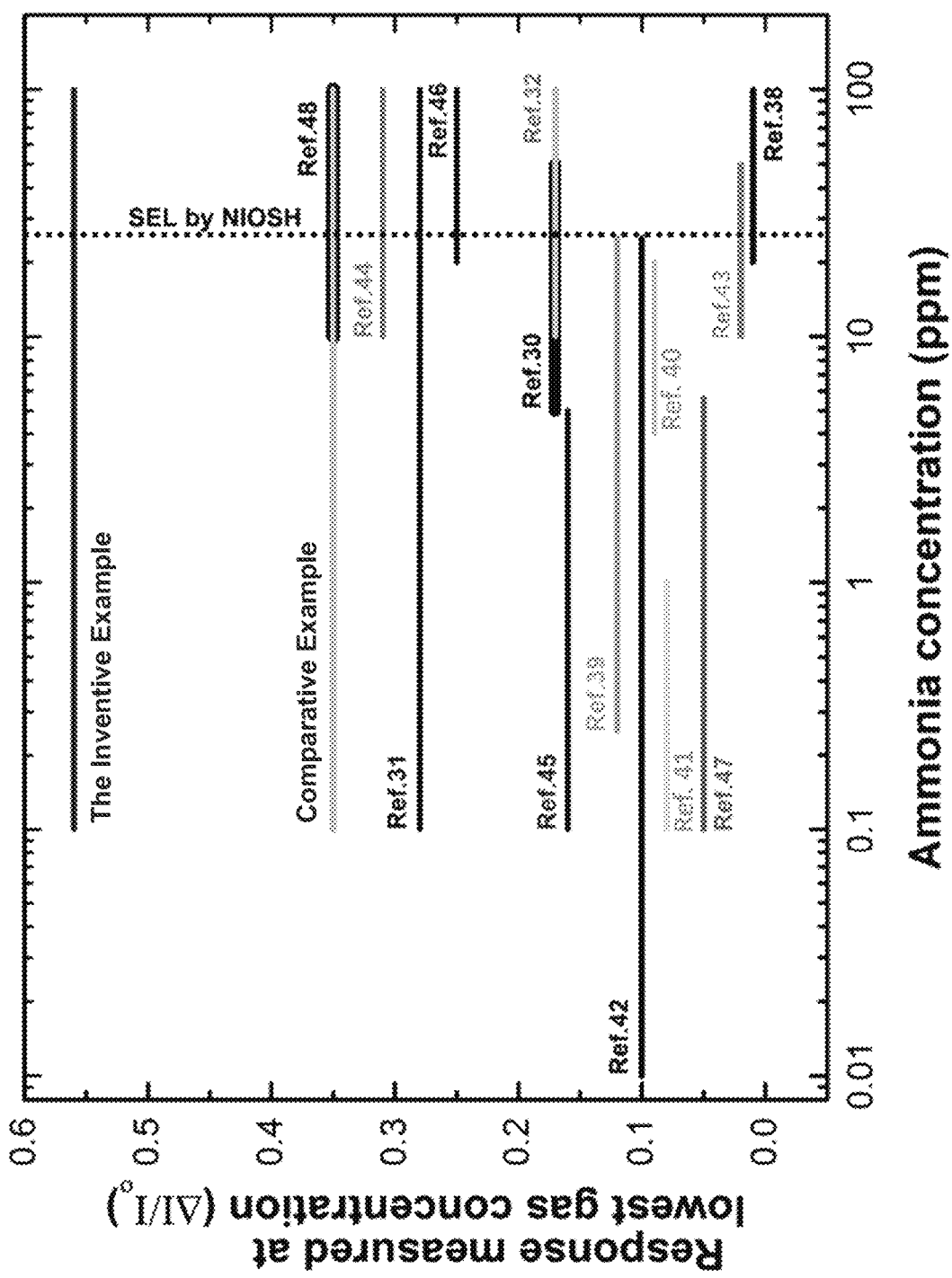
FIG. 22 shows the comparing results for the overall performance of the fluid sensing device of the present invention and the best P3HT-based ammonia fluid sensors hitherto reported in literature.

The overall performance of the fluid sensing device of the present invention is compared with the best P3HT-based ammonia fluid sensors hitherto reported in literature, the results are shown in FIG. 22 and Table 2.

TABLE 2

| Device type | Indicator | Matrix/Composites | Operating voltage (V) | Concentration range (ppm) (min to max) | Response ($\Delta I/I_0$) (min to max) | Year/Ref. |
|---|---|---|---|---|---|---|
| Three-terminal (Transistor) | P3HT | $PC_{61}BM$ | −50 | 20-100 | 0.01-0.2 | 2015/[38] |
| Three-terminal (Transistor) | P3HT | Graphene | −60 | 0.25-25 | 0.12-0.90 | 2016/[39] |
| Three-terminal (Transistor) | P3HT | $MoS_2$ | −50 | 4-20 | 0.09-0.15 | 2016/[40] |
| Three-terminal (Transistor) | P3HT | PS | −40 | 5-50 | 0.17-0.52 | 2016/[30] |
| Two-terminal (Conductor) | P3HT | DMA + TMA | 2 | 0.1-1 | 0.08-0.48 | 2017/[41] |
| Three-terminal (Transistor) | P3HT | 1,2,4-TCB | −50 | 0.01-25 | 0.10-0.93 | 2017/[42] |
| Two-terminal (Conductor) | P3HT | ZnO | — | 0.1-5 | 0.16-0.37 | 2017/[43] |
| Two-terminal (Conductor) | P3HT | rGO | — | 10-50 | 0.02-2.8 | 2018/[44] |
| Three-terminal (Transistor) | P3HT | PMMA | −60 | 10-100 | 0.31-0.89 | 2018/[45] |
| Three-terminal (Transistor) | rr-P3HT | — | −45 | 20-100 | 0.25-0.94 | 2018/[46] |
| Three-terminal (Transistor) | P3HT | DCB-0.75m | −80 | 0.1-100 | 0.28-0.80 | 2018/[31] |
| Two-terminal (Conductor) | P3HT | CT | 5 | 0.1-5.6 | 0.052-0.318 | 2019/[47] |
| Three-terminal (Transistor) | P3HT | TPFB | −100 | 10-100 | 0.17-0.65 | 2020/[32] |
| Two-terminal (Conductor) | P3HT | rGO-MWCNT | — | 10-100 | 0.35-0.60 | 2021/[48] |
| Two-terminal (Conductor) | P3HT | — | 0.5 | 0.1-100 | 0.52-0.86 | Inventive Example |
| Two-terminal (Conductor) | P3HT | — | 0.5 | 0.1-100 | 0.35-0.55 | Comparative Example |

REFERENCE LITERATURES

[38]: Y. Chen, G. Xie, T. Xie, Y. Liu, H. Du, Y. Su, Y. Jiang, Thin film transistors based on poly(3-hexylthiophene)/[6, 6]-phenyl $C_{61}$ butyric acid methyl ester hetero-junction for ammonia detection, Chemical Physics Letters, vol. 638 (2015) 87-93.

[39]: S. Tiwari, A. K. Singh, S. K. Balasubramanian, W. Takashima, R. Prakash, Poly-3-hexylthiophene (P3HT)/graphene nanocomposite field-effect-transistor as ammonia detector, J. Nanosci. Nano-Technol. vol. 16 (9) (2016) 9634-9641.

[40]: T. Xie, G. Xie, Y. Su, D. Hongfei, Z. Ye, Y. Jiang, Ammonia gas sensors based on poly (3-Hexylthiophene)-molybdenum disulfide film transistors, Nanotechnology vol. 27 (6) (2016).

[30]: S. Han, X. Zhuang, W. Shi, X. Yang, L. Li, J. Yu, Poly(3-hexylthiophene)/polystyrene (P3HT/PS) blends based organic field-effect transistor ammonia gas sensor, Sens. Actuators, B: Chem. vol. 225 (2016) 10-15.

[41]: L. Y. Chang, et al., One-minute fish freshness evaluation by testing the volatile amine gas with an ultrasensitive porous-electrode-capped organic gas sensor system, ACS Sens. vol. 2 (4) (2017) 531-539.

[42]: S. Mun, Y. Park, Y. E. K. Lee, M. M. Sung, Highly sensitive ammonia gas sensor based on single-crystal Poly(3-Hexylthiophene) (P3HT) organic field effect transistor, Langmuir vol. 33 (47) (2017) 13554-13560.

[43]: C. G. Kuo, J. H. Chen, Y. C. Chao, P. L. Chen, Fabrication of a P3HT-ZnO nanowires gas sensor detecting ammonia gas, Sensors vol. 18 (1) (2017).

[44]: L. M. Long, N. N. Dinh, T. Q. Trung, Characterization of $NH_3$ sensing properties of P3HT+rGO+CNT composite films made by spin-coating, Commun. Phys. vol. 28 (4) (2018) 369.

[45]: X. Wang, et al., Ultrathin semiconductor films for $NH_3$ gas sensors prepared by vertical phase separation, Synth. Met. vol. 244 (2018) 20-26.

[46]: V. R. Rajeev, A. K. Paulose, K. N. N. Unni, Ammonia gas detection using field-effect transistor based on a solution-processable organic semiconductor, Vacuum vol. 158 (2018) 271-277.

[31]: S. Wei, et al., Helical nanofibrils of block copolymer for high-performance ammonia sensors, ACS Appl. Mater. Interfaces vol. 10 (26) (2018) 22504-22512.

[47]: S. Y. Yu, et al., A versatile method to enhance the operational current of air-stable organic gas sensor for monitoring of breath ammonia in hemodialysis patients, ACS Sens. vol. 4 (4) (2019) 1023-1031.

[32]: A. A. Meresa, F. S. Kim, Selective ammonia-sensing platforms based on a solution-processed film of poly(3-Hexylthiophene) and p-doping tris(Pentafluorophenyl) borane, Polymers vol. 12 (1) (2020).

[48]: T. S. T. Khanh, et al., Ammonia gas sensing characteristic of P3HT-rGO-MWCNT composite films, Appl. Sci. vol. 11 (15) (2021).

In FIG. 22, the X and Y axes represent $NH_3$ concentration and the response measured at the lowest $NH_3$ concentration in corresponding studies, respectively. The length of the horizontal straight line denotes the range of $NH_3$ concentration measured in the specific study. The dotted vertical line represents the safe exposure limit (SEL) to human health set by National Institute for Occupational Safety and Health (NIOSH), USA.

Obviously, the performance of the fluid sensing device using a through-hole membrane as the substrate according to the present invention is better than other sensors reported in the above-mentioned literatures. The sensing device of the present invention not only shows a long dynamic range (100 ppb to 100 ppm), but also exhibits the highest response (0.56) to 100 ppb of $NH_3$ fluid, which is much higher than that of the other sensors reported the above-mentioned literatures.

Optimization of Operating Voltage

Figure 23A:
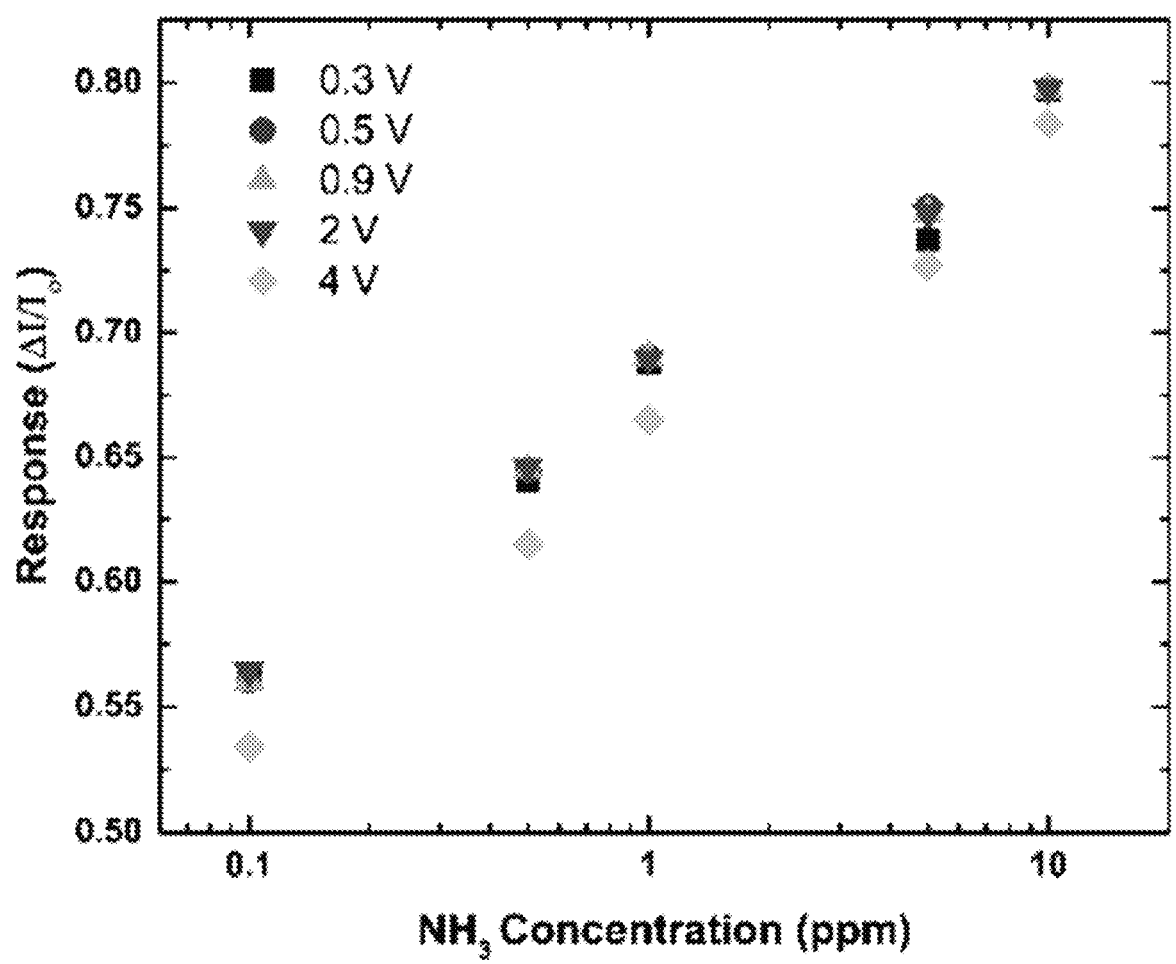
FIGS. 23A and 23B show the response and sensitivity of the fluid sensing devices of the present invention at different voltages, respectively.
Figure 23B:
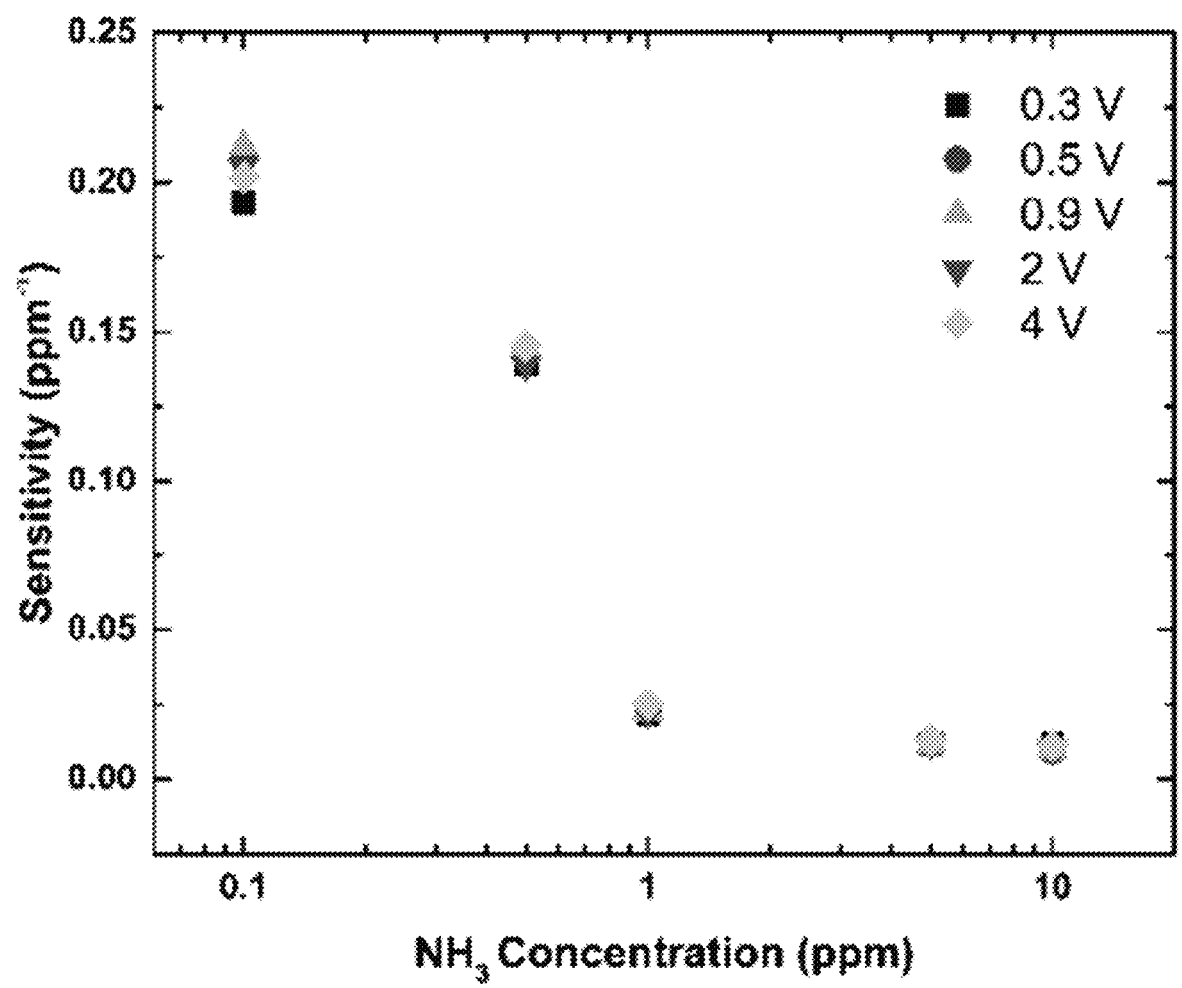

The optimization of the operating voltage of the fluid sensing device of the present invention is conducted by plotting the data of response and sensitivity of the fluid sensing device at various voltages, the results are shown in FIGS. 23A and 23B. Obviously, the fluid sensing device of the present invention works efficiently even at a bias voltage as low as 0.5V. The relationship of $NH_3$ concentration-current ($I_c$) at a bias voltage of 0.5V is plotted in FIG. 23C. Since the I-V characteristic follows Ohm's law, the $I_c$ value is proportional to the applied bias voltage, that is, the higher the voltage, the higher the $I_c$ value.

Figure 23C:
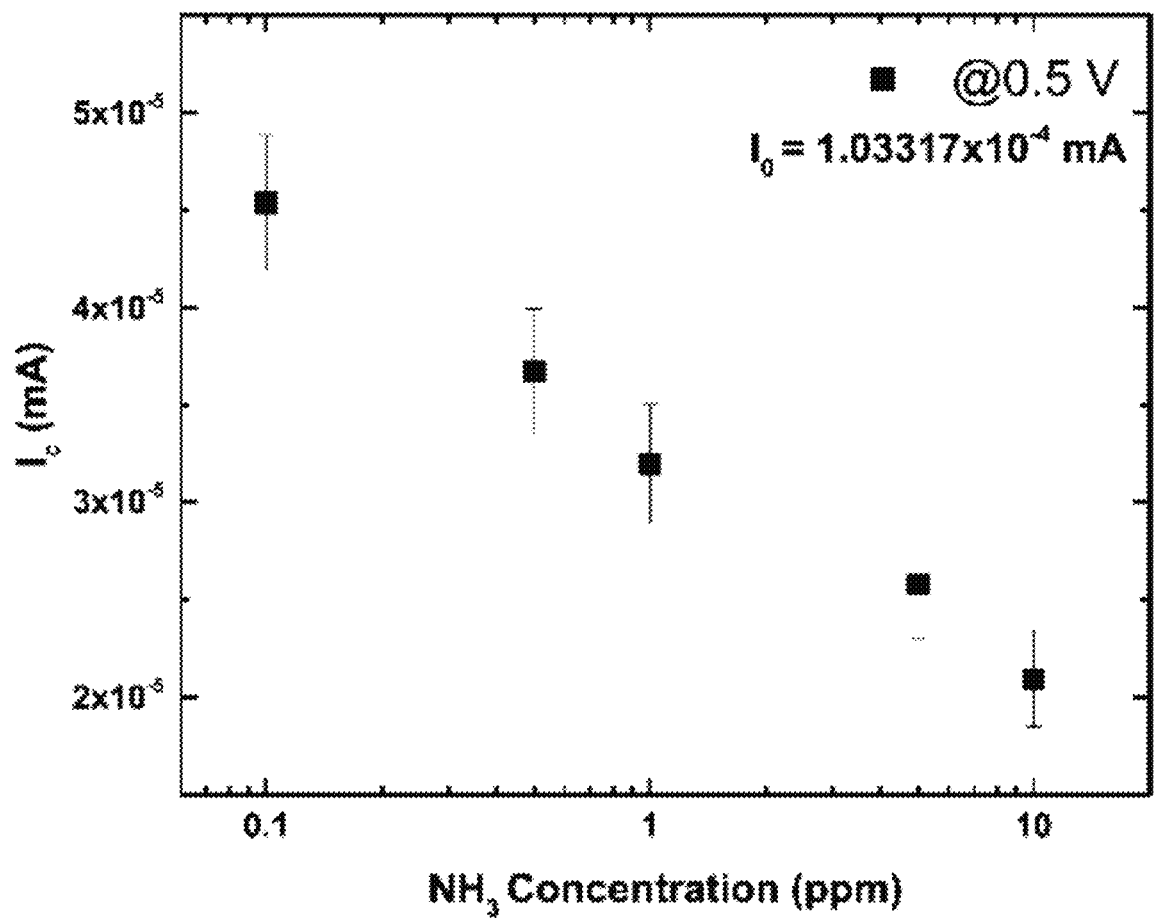
FIG. 23C shows the relationship of $NH_3$ concentration-current of the fluid sensing device of the present invention at a bias voltage of 0.5V.

As can be seen from the results in FIG. 23C, the value of the current passing through the fluid sensing layer of the fluid sensing device varies as the $NH_3$ concentration changes. Therefore, in addition that the concentration of a specific fluid (e.g., $NH_3$) in a specific environment can be converted from the calculated response of the fluid sensing device as described above, it is also possible to directly measure the value of the current passing through the fluid sensing layer when exposed to a specific concentration of fluid, and then convert the concentration of the specific fluid by a lookup table, a functional relation, or a relation curve of the current value and the concentration of the specific fluid.

Optimization of Nanochannel Diameter

Generally, less nanochannel diameter may enable the increasing of the surface area for interaction between the fluid sensing layer and the fluid molecules, thereby contributing to higher response and sensitivity of the fluid sensing device. However, the less channel diameter will strongly affect (reduce) the diffusion of fluid molecules through the nanochannels. Therefore, AAO through-hole membranes with average channel diameters of 20, 100 and 200 nm are used as substrates to manufacture the fluid sensing devices of the present invention, respectively, and the response and sensitivity at various $NH_3$ concentrations are measured, the results are shown in FIGS. 24A and 24B.

Figure 24A:
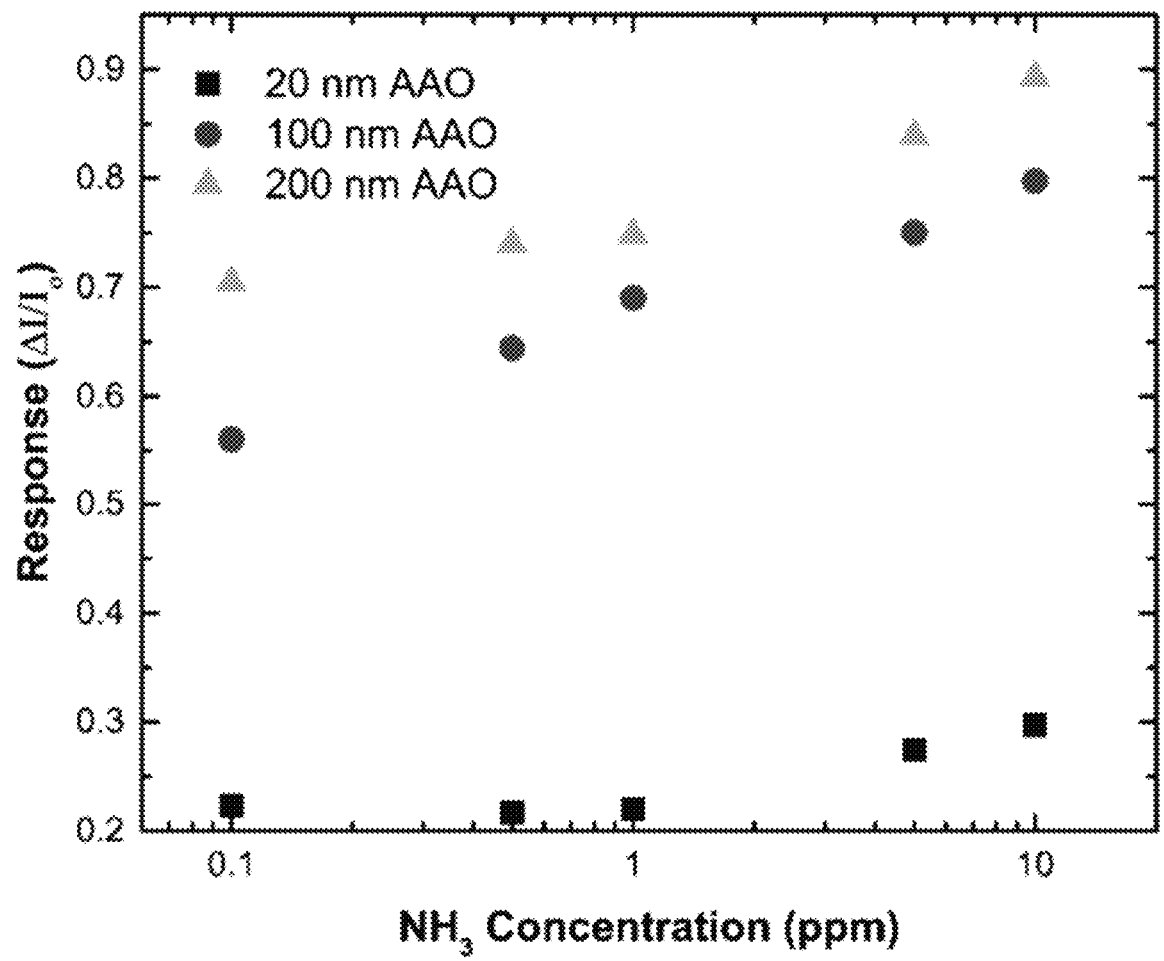
FIGS. 24A and 24B show the response and sensitivity of the fluid sensing device of the present invention with different average channel diameters, respectively.
Figure 24B:
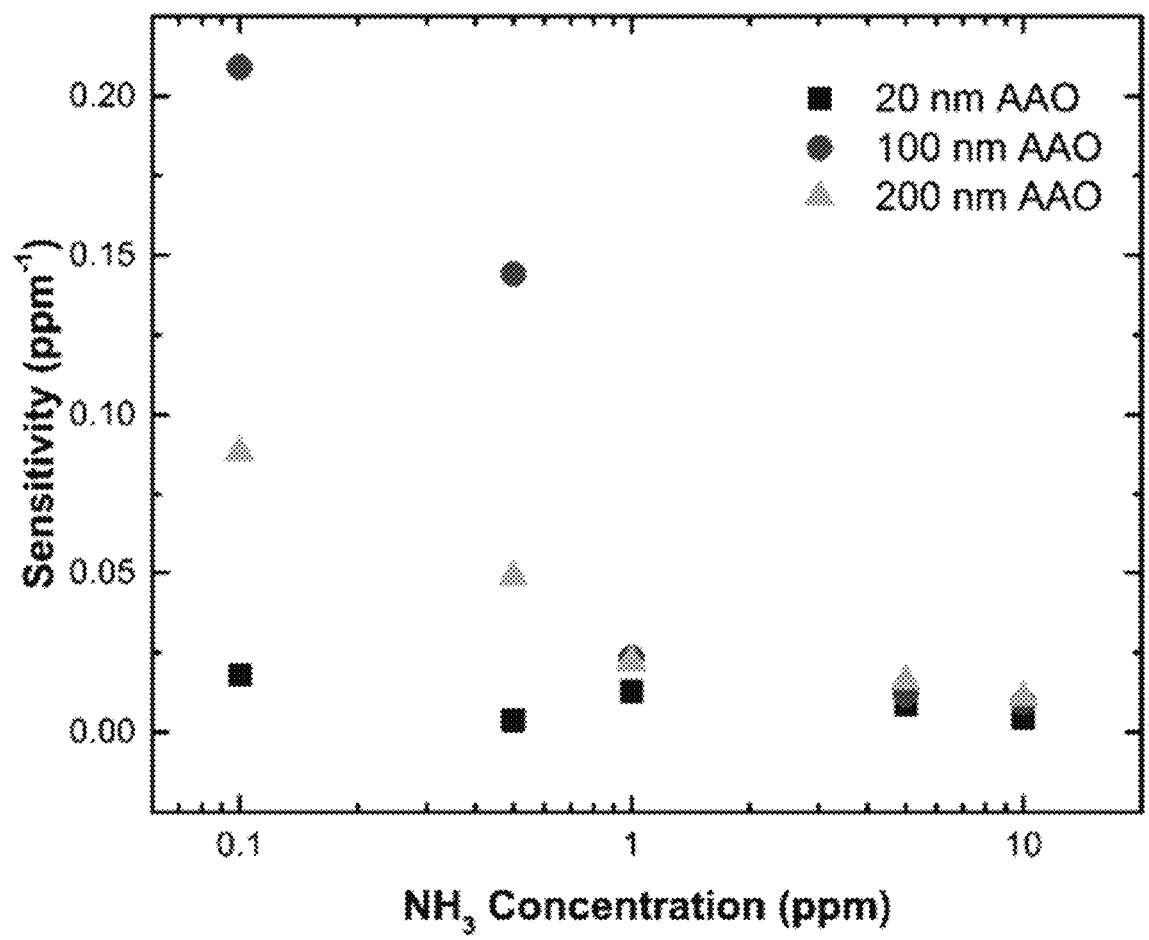

As can be seen from FIGS. 24A and 24B, in the three fluid sensing devices with different average channel diameters, the fluid sensing device with an average channel diameter of 100 nm has relatively high response and highest sensitivity at low concentrations, so that the average channel diameter of the fluid sensing device is optimized to be 100 nm among 20, 100 and 200 nm.

Figure 25:
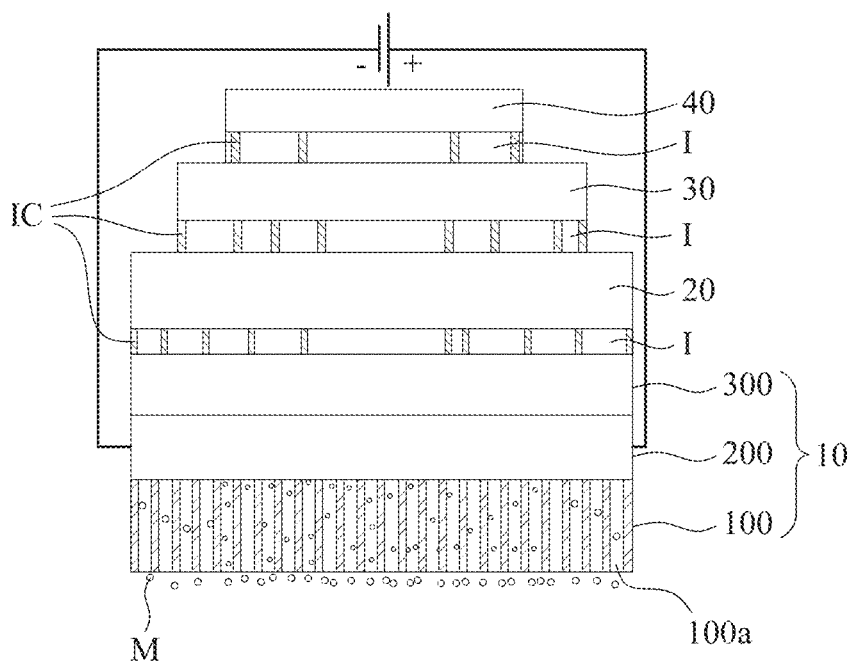
FIG. 25 illustrates an aspect of vertical integration of the two-way fluid sensing device of the present invention.

As shown in FIG. 25, the highly sensitive fluid sensing device 10 of the present invention can be vertically integrated with other electronic devices (e.g., devices 20, 30 and 40), 3D circuits (e.g., circuit IC shown in the figure), or a combination thereof via the top surface of the fluid sensing layer 300. In addition, the fluid molecules M can contact the fluid sensing layer 300 from the bottom side of the substrate 100 through the channels 100a of the substrate 100 and the gap between the interdigitated structures of the interdigitated electrode 200, without sacrificing the interaction area between the indicator molecules and the analyte molecules. The above-mentioned electronic devices includes a chip, a memory unit, a computing unit, an interface circuit, a microelectromechanical system (MEMS), a processor unit, a power unit, or a combination thereof. In one embodiment, the first interdigitated electrode and the second interdigitated electrode of the interdigitated electrode 200 may be connected to the positive electrode and the negative electrode of the power supply, respectively.

Figure 26:
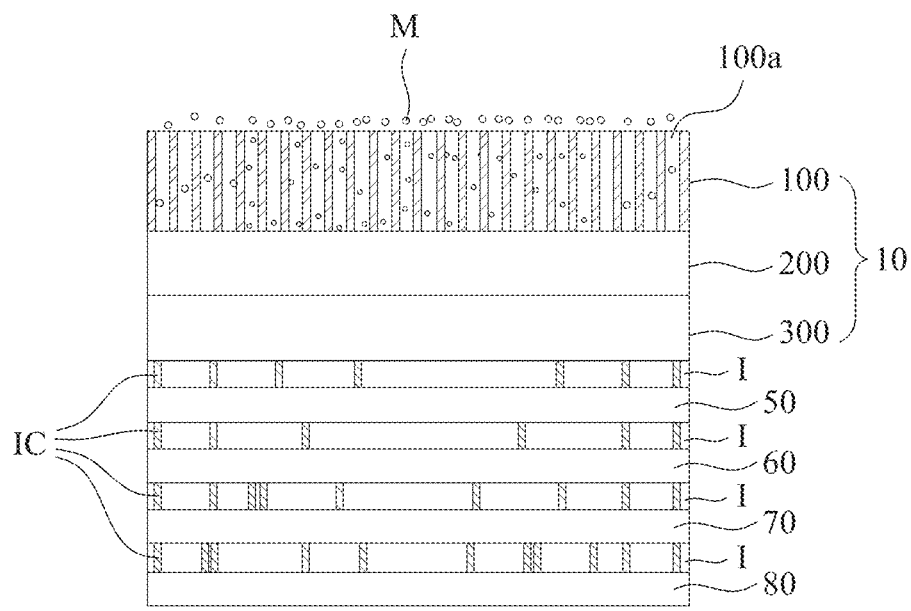
FIG. 26 illustrates another aspect of vertical integration of the two-way fluid sensing device of the present invention.

Alternatively, as shown in FIG. 26, the highly sensitive fluid sensing device 10 of the present invention can be turned upside down, whereby other electronic devices (e.g., devices 50, 60, 70, and 80), 3D circuits (e.g., circuit IC shown in the figure), or a combination thereof can be vertically integrated with the fluid sensing device 10 shown in FIG. 26 via the bottom surface of the fluid sensing layer 300 (the bottom surface of the fluid sensing layer 300 shown in FIG. 26). In addition, the fluid molecules M can contact the fluid sensing layer 300 from the top side (the top surface of the substrate 100 shown in FIG. 26) of the substrate 100 through the channels 100a of the substrate 100 and the gap between the interdigitated structures of the interdigitated electrode 200, without sacrificing the interaction area between the indicator molecules and the analyte molecules. In one embodiment, the devices 50, 60, 70 and 80 may be a microelectromechanical system, a memory unit, a processor unit, and a power unit, respectively.

In summary, the fluid sensing device of the present invention is quite successful due to its highly sensitive characteristics, wherein the fluid sensing layer is provided on the through-hole membrane as a substrate, and a very high response is achieved by the increasing of the interaction area between the indicator molecules and the analyte molecules (the response to 100 ppb of $NH_3$ fluid is 0.56). This is because the fluid molecules not only can interact with the fluid sensing layer from the top side of the fluid sensing device, but also can interact with the fluid sensing layer from the bottom side of the fluid sensing device through the nanochannels of the substrate and the interdigitated electrodes. In addition, the sensitivity of the fluid sensing devices of the present invention abruptly increases at low $NH_3$ concentrations (<20 ppm).

At a low bias voltage of 0.5 to 1V, such as 0.5V, compared to the glass substrate based fluid sensing device, the through-hole substrate based fluid sensing device of the present invention not only exhibits higher sensitivity (i.e., the limit of detection is lower); but also can normally conduct the fluid sensing function, even if the fluid molecules cannot contact the fluid sensing layer from the top side of the fluid sensing device.

Therefore, the two-way fluid sensing device of the present invention has the advantages of increased sensing surface area, feasibility of vertical integration, low operating voltage, and low fabrication complexity, etc., which is expected to be adopted commercially in near future.

The above description and accompanying drawings are only used to explain specific embodiments of the present invention, but are not intended to limit the claimed scope of the present invention in any form. Therefore, those skilled in the art will understand that various modifications and changes, such as combination, separation, replacement and configuration change, can be made to the embodiments of the present invention without departing from the creative spirit of the present invention.

The technical contents of academic journal titled "Achieving high response of poly (3-hexylthiophene-2,5-diyl) molecules to gaseous ammonia using anodic aluminum oxide nanoporous substrate operated under 1 V", published in Sensors and Actuators B: Chemical, are incorporated herewith by reference.

What is claimed is:

1. A two-way fluid sensing device, comprising:
   a substrate, which is a through-hole membrane having a plurality of channels penetrating from a top surface of the substrate to a bottom surface of the substrate;
   an interdigitated electrode, which has a plurality of interdigitated structures, and is provided on the substrate; and
   a fluid sensing layer, which contains a fluid sensing material, and is provided on the interdigitated electrode;
   wherein the interdigitated electrode includes:
      a conductive metal layer, which contains a conductive metal, and is provided on the substrate; and
      a conductive polymer layer, which contains a conductive polymer, and is provided between the conductive metal layer and the fluid sensing layer.

2. The two-way fluid sensing device according to claim 1, wherein the through-hole membrane is an anodic aluminum oxide through-hole membrane.

3. The two-way fluid sensing device according to claim 1, wherein the plurality of channels of the through-hole membrane has an average diameter of 20 to 200 nm and a length of 50 to 70 µm.

4. The two-way fluid sensing device according to claim 1, wherein the fluid sensing material includes poly(3-hexylthiophene-2,5-diyl).

5. The two-way fluid sensing device according to claim 1, wherein the conductive metal includes Ag.

6. The two-way fluid sensing device according to claim 1, wherein the conductive polymer includes poly(3,4-ethylenedioxythiophene)-poly(styrene sulfonate).

7. The two-way fluid sensing device according to claim 1, wherein the fluid sensing layer has a thickness of 15 to 20 nm.

8. The two-way fluid sensing device according to claim 1, wherein the conductive metal layer has a thickness of 175 to 225 nm.

9. The two-way fluid sensing device according to claim 1, wherein the conductive polymer layer has a thickness of 40 to 60 nm.

10. The two-way fluid sensing device according to claim 1, wherein the interdigitated electrode includes:
    a first interdigitated electrode having a plurality of first interdigitated structures separated from each other; and
    a second interdigitated electrode having a plurality of second interdigitated structures separated from each other, and
    wherein the first interdigitated electrode and the second interdigitated electrode are disposed on the substrate in a manner that the plurality of first interdigitated structures and the plurality of second interdigitated structures are alternately arranged.

11. The two-way fluid sensing device according to claim 10, wherein a single first interdigitated structure or a single second interdigitated structure has a length of 0.75 to 1.25 mm and a width of 17.5 to 22.5 µm.

12. The two-way fluid sensing device according to claim 10, wherein a space between a first interdigitated structure adjacent to a second interdigitated structure is 75 to 85 µm.

13. The two-way fluid sensing device according to claim 1, wherein the two-way fluid sensing device is vertically integrated with an electronic device, a 3D circuit, or a combination thereof via the fluid sensing layer.

14. The two-way fluid sensing device according to claim 11, wherein the electronic device includes a chip, a memory unit, a computing unit, an interface circuit, a microelectromechanical system, a processor unit, a power unit, or a combination thereof.

15. A two-way fluid sensing method for detecting a concentration of a specific fluid in a specific environment using the two-way fluid sensing device according to claim 1, comprising:
    a) exposing the two-way fluid sensing device to the specific environment;
    b) applying a bias voltage to the two-way fluid sensing device;
    c) measuring a current passing through the two-way fluid sensing device; and
    d) converting the concentration of the specific fluid in the specific environment from the measured current.

16. The two-way fluid sensing method according to claim 15, wherein in the step a), placing the two-way fluid sensing device in the specific environment such that a top side, a bottom side, or a combination thereof of the two-way fluid sensing device is in contact with the specific fluid in the specific environment.

17. The two-way fluid sensing method according to claim 15, wherein the specific fluid is $H_2$, $N_2$, $NH_3$, NO, $NO_2$, $O_2$, $CO_2$, $SO_2$ or $H_2S$.

18. The two-way fluid sensing method according to claim 15, wherein the bias voltage applied in the step b) is 0.5 to 1V.

* * * * *